(12) United States Patent
Peto

(10) Patent No.: US 9,285,854 B2
(45) Date of Patent: Mar. 15, 2016

(54) MODULAR COMBINED OPTICAL DATA NETWORK AND INDEPENDENT DC POWER DISTRIBUTION SYSTEM

(76) Inventor: Raymond Peto, Dorchester (GB)

( * ) Notice: Subject to any disclaimer, the term of this patent is extended or adjusted under 35 U.S.C. 154(b) by 255 days.

(21) Appl. No.: 13/820,868

(22) PCT Filed: Sep. 7, 2011

(86) PCT No.: PCT/GB2011/001313
§ 371 (c)(1),
(2), (4) Date: Mar. 5, 2013

(87) PCT Pub. No.: WO2012/032293
PCT Pub. Date: Mar. 15, 2012

(65) Prior Publication Data
US 2013/0173939 A1 Jul. 4, 2013

(30) Foreign Application Priority Data
Sep. 7, 2010 (GB) .................................. 1014782.5

(51) Int. Cl.
*G06F 1/26* (2006.01)
*H04L 12/10* (2006.01)
*H04L 12/28* (2006.01)

(52) U.S. Cl.
CPC ................ *G06F 1/266* (2013.01); *H04L 12/10* (2013.01); *H04L 12/2838* (2013.01); *Y02B 10/30* (2013.01); *Y02B 70/325* (2013.01); *Y04S 20/228* (2013.01)

(58) Field of Classification Search
CPC ..... G06F 1/266; H04L 12/10; H04L 12/2838; Y04S 20/228
USPC ........................................................ 713/300
See application file for complete search history.

(56) References Cited

U.S. PATENT DOCUMENTS 8,674,823 B1 * 3/2014 Contario et al. ............... 340/538
2005/0169056 A1 * 8/2005 Berkman et al. .......... 365/185.22

(Continued)

FOREIGN PATENT DOCUMENTS

CN            201252541 Y  *  6/2009  ............... H04B 3/54

*Primary Examiner* — Thomas Lee
*Assistant Examiner* — Chad Erdman
(74) *Attorney, Agent, or Firm* — William H. Bollman

(57) ABSTRACT

This invention relates to a modular combined optical data and electrical power distribution network and related system. More particularly the invention relates to a system for bi directional high-speed distribution of data and the universal transmission of significant quantities of electrical power using composite cabling which is adapted for connection to a plurality of peripheral components and devices. Previous data networks, particularly in domestic environments, for example for controlling personal computers, laptops and peripherals such as printers and scanners required dedicated power supplies and resulted in a tangled mass of wires and cabling often seen as clutter and sometimes posing safety hazards. The invention overcomes this problem by providing a relatively low voltage continual power bus, in the form of a dual or multi-core wire, which typically carries up to 100-200 Watts per node and which is also capable of carrying high volumes of data traffic typically in excess of 1 GBit/sec. The invention comprises: a data bus and an electrical conductor encased within a sleeving, the data bus defining a path for data and the conductor defining an electrical path. The sleeving is shaped and dimensioned so as to be capable of receiving junction connectors which, in use pierce the sleeving, so as to provide simultaneous connection to the data bus and electrical path. This is combined with intelligent power and data circuitry.

22 Claims, 29 Drawing Sheets

(56) References Cited

U.S. PATENT DOCUMENTS

| | | | |
|---|---|---|---|
| 2009/0210178 A1* | 8/2009 | Bieganski | 702/62 |
| 2010/0046642 A1* | 2/2010 | Yelland et al. | 375/257 |
| 2010/0162008 A1* | 6/2010 | Nakashima et al. | 713/300 |
| 2010/0198965 A1* | 8/2010 | Tanaka | 709/224 |
| 2010/0283391 A1* | 11/2010 | Braunshtein | 315/127 |
| 2011/0270456 A1* | 11/2011 | Kouda | H02J 13/0075 700/292 |
| 2012/0288016 A1* | 11/2012 | Ichikawa | 375/257 |

* cited by examiner

140

PLUGINS

EMERGENCY POWER BACK UP FOR ESSENTIAL EQUIPMENT
MICROPHONE/LOUDSPEAKER IN EVERY ROOM
MULTIFUNTION
CO DETECTOR
USAGE OF EQUIPMENT DETECTOR
EMERGENCY BUTTON
MOVEMENT DETECTOR
TIME
FIRE
ALARM BUTTON
STEAM/HUMIDITY
LOW LEVEL CRAWL ACCESSIBILITY
TEMPERATURE
DOOR BELL
TIMER
CAMERA
DEAF/BLIND
DISPENSING
JOGGING (REMINDING)
DEAD MAN HANDLE (PRESS TO ACKNOWLEDGE)
LIGHT
CALL IN TO CHECK
CALL OUT TO ALARM
DIRECT TO HELP/DOCTOR ETC.

FIG. 14B

MODULAR COMBINED OPTICAL DATA NETWORK AND INDEPENDENT DC POWER DISTRIBUTION SYSTEM

FIELD OF THE INVENTION

This invention relates to a modular combined optical data network and independent direct current (DC) power distribution system.

More particularly the invention relates to a modular optical data network and independent DC power distribution system for high-speed distribution of data and provision of low voltage DC power, using composite cabling which is adapted for connection to a plurality of peripheral components and devices.

BACKGROUND OF THE INVENTION

A number of data networks or data distribution systems exist and are extremely robust and have proven useful for high speed, and high bandwidth, data communication. In this sense the term data is intended to include any form of digital or analogue data, including without limitation: voice, image, video, text, binary or encrypted data.

An example of a data network is often referred to as a local area network (LAN) and includes the type of communication networks often found in offices and intranet systems. The backbone of such LANs is usually CAT 5 cabling and a variety of different forms and category of CAT 5 exist.

Another type of network that is secure often within an office or company and is referred to as ETHERNET since the development of wireless technology such as 802 MHz there has been a rapid growth of so-called wireless networks, nowadays often referred to as 'Wi-Fi'.

In domestic and office environments there is also a short range group of networks that have grown up using infra red (IR) direct line of sight peripherals, which have been successfully sending signals from personal computers and laptops to and from peripherals such as printers and scanners. Other short range networks employ Bluetooth (Trade Mark) technology for short range, low data transmissions.

The demands and success of these networks depend upon many factors, including: cost of implementation, flexibility, ability to integrate into new and existing systems, maximum data handling capacity and resistance to noise and suitability to hostile environments.

Increasingly networks have been interconnected to enable pooling of data flow and data management. An example of such systems is universal management traffic systems (UMTEnhanced Data rates for GSM Evolution (EDGE) technologies, where, for example a digitised telephone conversation may be transmitted, as packets, via a number of different transmitted links or data carriers, for example a domestic access digital communication telephone (DECT) telephone.

A suitable junction device in use, is connected, to a data terminal and receives an optical communication signal and has an independent power supply for forwarding the signal, for example, to a handheld device. In addition this self power facility includes a battery back-up (in the form of an uninterrupted power supply—UPS) so that signals sent to and received from the Internet before it is received for example at a base station then via a wide area network (WAN) to remote handheld units or mobile telephones. Such variable and flexible data carrier networks are often referred to as universal mobile telecommunications systems (UMTS).

PRIOR ART

Increasingly, with the convergence of media such as satellite and terrestrial digital TV television, broadband domestic access, digital communication telephones (DECT), personal gaming and home entertainments systems as well as conventional personal computer (PC) peripheral such a printers, scanners, speakers and digital screens, there is a preponderance of wires, cabling and other paraphernalia that is often seen as a clutter.

One object of the invention is to provide low voltage, typically around 48 volt, DC power supply which is independent from a conventional domestic mains supply, so as to significantly improve the efficiency and utility of electrical equipment.

Another object of the invention is to overcome the problem of excess and unsightly cabling, which is not only unsightly, but also poses a fire and trip hazard.

Another object is to provide a network solution to remove the need for power adaptors and transformers, which draw, albeit only a small amount of current, but also add to the cost of many electrical items as they often only require a few tens up to a hundred Watts of power and therefore require transformers to reduce and transform the mains input to the power current and voltage needed.

Another object of the invention is to provide a solution to the conflicting requirements of home automation, energy efficiency and simplicity of living (amongst many others) by providing a new platform of interoperability between all these disparate concepts

SUMMARY OF THE INVENTION

According to a first the present invention there is provided a modular optical data network for power distribution and data communication comprising: a data bus and an electrical conductor encased within a sleeving, the data bus defining a path for data and the conductor defining an electrical path; the sleeving being shaped and dimensioned so as to be capable of receiving junction connectors which, in use provide simultaneous communication to the data bus and contact with the electrical path.

According to a second aspect of the present invention there is provided a modular optical data network comprising: a multi-core cable; an optical fibre data cable within said multi-core cable; a power supply cable within said multi-core cable; an insulating sheath about said multi-core cable; a connector clamp with means to pierce through the insulating sheath to electrically connect to said multi-core cable; and a data distribution device to electrically connect to said connector clamp to facilitate data and/or power distribution.

Thus the invention overcomes problems associated with the prior art and meets the aforementioned objects, by providing a relatively low voltage continual power bus, in the form of a dual or multi-core wire and cable combination, which typically carries up to 100-200 Watts to each plate for the standard fibre/copper cable combination.

Another advantage of the invention is that it facilitates high speed data transfer, without loss or degradation of signal, drop outs or electromagnetic interference.

Ideally the piercing means comprises: a plurality of metal projections spaced and arranged to engage with the metal conductors of the power cable. The connectors arranged to communicate with data busses are ideally index matched so as to reduce optical losses.

According to a third aspect of the present invention there is provided a system for power distribution and data communication comprising: a network; a data bus and an electrical conductor encased within a sleeving the data bus defining a path for data and the conductor defining an electrical path for power; the sleeving being shaped and dimensioned so as to be capable of receiving junction connectors which, provide simultaneous communication to the data bus and contact with the electrical path and a control means is provided for monitoring a condition or state of the system and relaying data relating to the condition or state of the system via either the data bus or electrical path for power; a means for determining a hierarchy for appliances in accordance with their power consumption requirements; and a means for isolating appliances in accordance with at least one predetermined criterion.

It is thus appreciated that use of the invention in its broadest sense enables a domestic user to effectively devise a single 'backbone' of cabling and to site or locate plugs peripheral or indeed a myriad devices at any point on the cable without the need to be concerned with a nearby power supply, for example in which to plug a transformer for powering the peripheral device and—importantly—without the clutter of different cables and accessories. Cables may be integrated into new buildings or retro-fitted to existing buildings.

Furthermore, although only polymer type optical cables are used as data carriers, it is understood that because the system is only intended for relatively small installations, the invention is ideally suited as a very broadband data carrier and is typically able to operate in excess of several hundred Mega Baud (MBits/sec) to data rates in excess of 1 Giga Baud (GBits/sec) and therefore the advantage of the optical data network is that connectors can be positioned at any location which can be an outlet plate, socket or peripheral.

Ideally the optical fibre data cable in the optical data network is a Plastic Optical Fibre (POF). In addition the optical data network distribution system includes a pair of copper cables to form a hybrid cable.

The optical data network may be adapted to be located so that it couples with a distribution device such as a wall plate, which may have one or more sockets, such as an Ethernet socket and/or a power socket.

Advantageously an inductor is located at a terminal of the electrical path, so as to isolate any data on the electrical path from power on the electrical path. Use of inductor at each end of an electrical conductor allows superimposed data to conform to any of the many standards of signalling, and also allows the simultaneous use of different standards on different limbs of a network.

Alternately the modular optical data network may be adapted to connect with a telecommunications plug or socket. This may be practically achieved by way of a transponder adapted for example to convert one form of digital signal into for example an optical signal.

Other peripheral devices may be connected directly to the optical data network. Examples of these are: a wireless data transmitter/receiver device, such as a Bluetooth (Trade Mark) transceiver or an infra red data transmitter/receiver device or an encoder suitable for converting one signal into another. Other examples of devices include: amplifiers, filters, switches and timers, such as for example a timer can be connected to the network and control other items connected to the bus.

A further feature of the invention is that it may be connected directly to electrical generating devices such as solar panels or windmills/wind turbines, so that in the event of a power failure, or for example when in remote locations, it is still possible to operate basic devices such a personal computer, laptop or other devices.

A power and data distribution system optionally includes sockets or a housing incorporating a programmable device. Said programmable device might include, for example: a timer arranged to switch another device or appliance on or off at a predetermined instant or a video tuner or an encoder or a converter for converting one signal into another.

In addition to the aforementioned electrical and optical peripheral and communication devices, the system is also adapted to the accepted standard of mechanical devices such as clamps, junction boxes, and adaptors; as well as operative devices such as lamps, chargers, fans, displays, printers and scanners. Most of the aforementioned devices are relatively low power consumption items and could be modified to be powered by the distributed power or the distributed power could be converted locally into a power format suitable for the device.

In addition to the aforementioned devices there is also provided a method of distributing a data network comprising: providing: a data bus and an electrical conductor encased within a sleeving, the data bus defining a path for data and the conductor defining an electrical path; the sleeving being shaped and dimensioned so as to be capable of receiving junction connectors, piercing the sleeving, so as to provide simultaneous connection to the data bus and electrical path and extracting current and/or data.

Current may flow in the electrical path in either direction, so facilitating drawing electricity from a mains supply (fed from the grid) or supplying electricity to the grid.

Preferably, the connector is formed from a synthetic plastics material and is ideally injection moulded. Ideally optical and electrical components are inserted into pre-formed recesses and are dimensioned and arranged so that they may connect with one another transferring power and data.

There may be a legislative requirement to provide a telephone connection to the customer using the usual 48 volt copper twisted pair analogue system.

Preferably the invention may be used to provide telephone services over fibre by transmitting voice over Internet protocol (VOIP) and decoding it at a wall plate and re-transmitting this to a telephone socket, which is ideally incorporated or wired to the plate. Alternatively this is achieved by plugging in an 'add on' unit to the wall plate to allow normal telephone to be plugged in as well.

Alternatively the telephone service is provided to an 8 way switch on copper from a telephone service provider. Telephone signals are converted in the switch to a modulation on the copper wires to a designated plate which has a demodulator and a standard telephone outlet capability. Modulation is typically superimposed on a carrier signal on the 48 volt cables, using ballast inductors at each end to isolate the 48 volt power from the modulation.

Alternatively the plate 48 volt conductors are isolated from the power system during power failures by the use of relays at the 8 way switch and the designated plate.

In a further alternative arrangement an extra pair of conductors is allocated to transfer the telephone signal from the 8 way switch to the designated plate.

One such system may employ an 8 way power data exchange (PDX)?? and a length of hybrid cable, with say 5 wallports and a mains to 48 volt power supply. To this could be added a home hub box/consumer unit and/or a back up battery, a battery charger and a 36 volt battery boost inverter. Such a system is suitable for powering a home Hi-Fi, data communication and an IP streaming TV and so could form a communication channel for an 'intelligent' home.

The design of the switch allows for more than one input from service providers. The switch and/or the wall plate can be programmed by installers to route and/or partition each service provider into specific paths or configurations and to ensure that communication between two (or more) service providers is inhibited. It is also possible for the two (or more) outputs of a plate to be allocated to two different service providers, thereby permitting telephone services to be supplied by a different company to, say, an Internet service. Alternatively an extension plugged into the plate may provide this facility.

Ideally the system is adapted to operate so as to be part of a telemetric system, allowing for signals from devices such as alarms and sensors to be sent to a wall plate or from the wall plate itself, or from the switch so that utilities or fire or security can monitor the status of devices or download values from a building in which the installation is incorporated. The power supply for this facility may be derived from the system as well as a 'UPS' facility connected to, or incorporated within, the 8 way switch as a backup as required.

Power is supplied to remote handsets so that these are able to operate in dependence of power received from the power on fibre cable, so that, in the event of a power outage telephones or other devices are able to communicate to a terminal Local wireless broadcasting (Wi-Fi) can be provided, at very low power, within a room by having either a plate with integral transmitter/receiver (Tx/Rx) and an antenna or a plug-in unit to provide this function. The advantage of this is that very local transmission is possible with very small signals. This is achievable as there is no metal (building steel, silvering on wall boards, significant physical distance between the transmitter and receiver etc) to hinder transmission. Also there is low radio frequency interference (RFI) as a result of leakage and interference with other systems on the same frequency (or harmonic) as well as data security issues. This is considered to be beneficial as in recent times there has been growing concern about the health aspects of high levels of RF transmissions.

Conventional Wi-Fi installations require high signal levels from a transmitter in order to reach a receiver through physical obstacles, as well as overwhelming transmissions from other systems nearby. This is a self perpetuating model as the more systems that are introduced the greater the strength of the transmission signal.

Alternatively the 48 volt cable can provide an additional pathway for data transmission in either direction between an 8 way switch and the wall plate. Modulation may typically be directly, or by use of a carrier signal, superimposed on the 48 volt cables, using ballast inductors at each end to isolate the 48 volt power from the modulation.

Alternatively the invention provides a relatively low voltage continual power bus which typically carries up to 100-200 Watts to each wall plate for the fibre/copper cable combination. This allows for the direct connection of the majority of standard equipment, that would usually be connected to a 230 volt AC power distribution system, to be plugged in to the wall plates instead using an appropriate power voltage converter if required. It is anticipated that future standard equipment may well be dual voltage allowing direct connection to both 240 volts and 48 volts.

Alternatively the invention provides a framework for the implementation of home automation and control, monitoring, autonomy, energy management and security, for example allowing a user to run a computer (laptop initially) and a modem with the combined power and data cable so that communication with the outside world is possible. The system also provides a charging point for devices such as mobile telephones and for low powered LED lights. Other low powered equipment and functions can be added to this minimal system as required.

The invention will now be described, by way of example only, with reference to the accompanying drawings, in which:—

DETAILED DESCRIPTION OF A PREFERRED EMBODIMENT OF THE INVENTION

Figure 1:
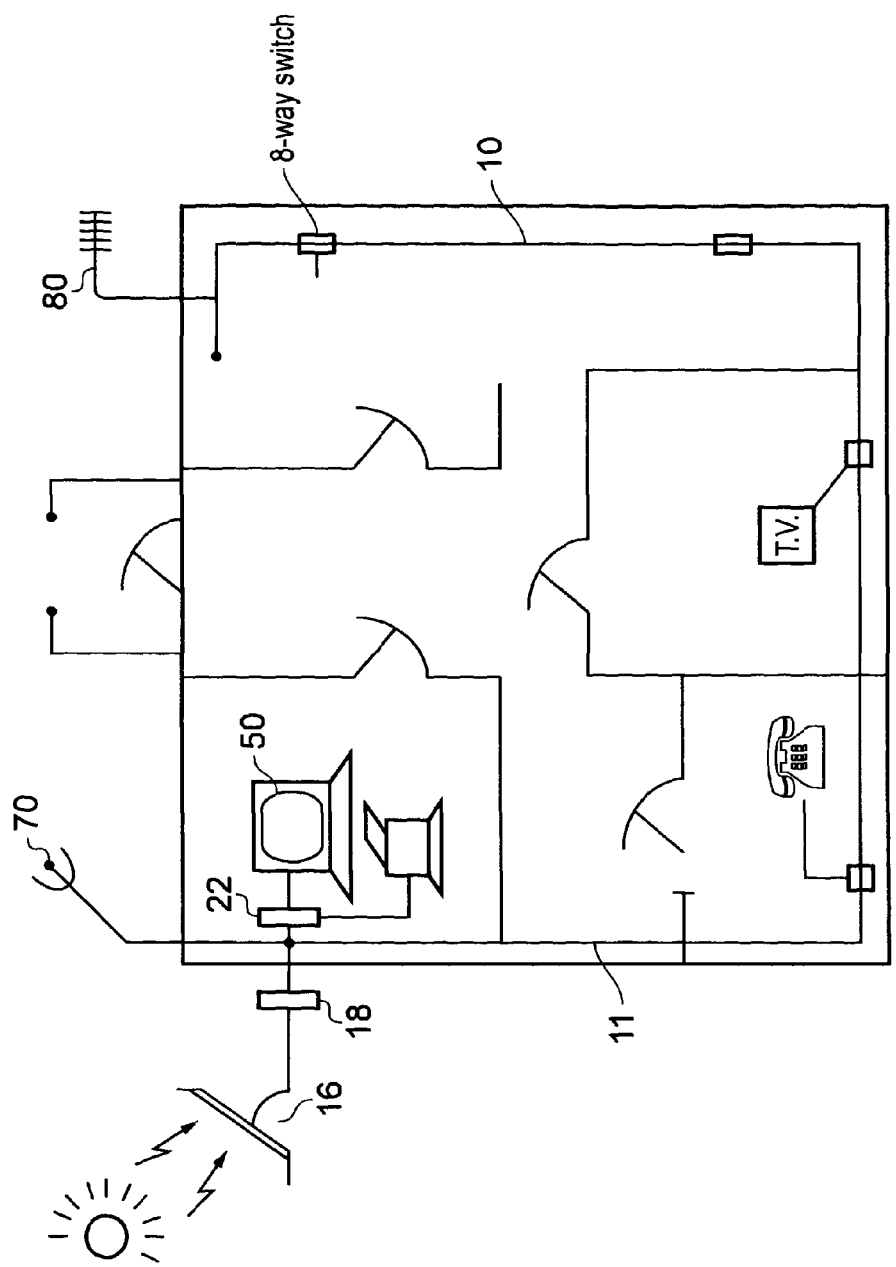
FIG. 1 is a block diagram of a house showing key system components.
Figure 2A:
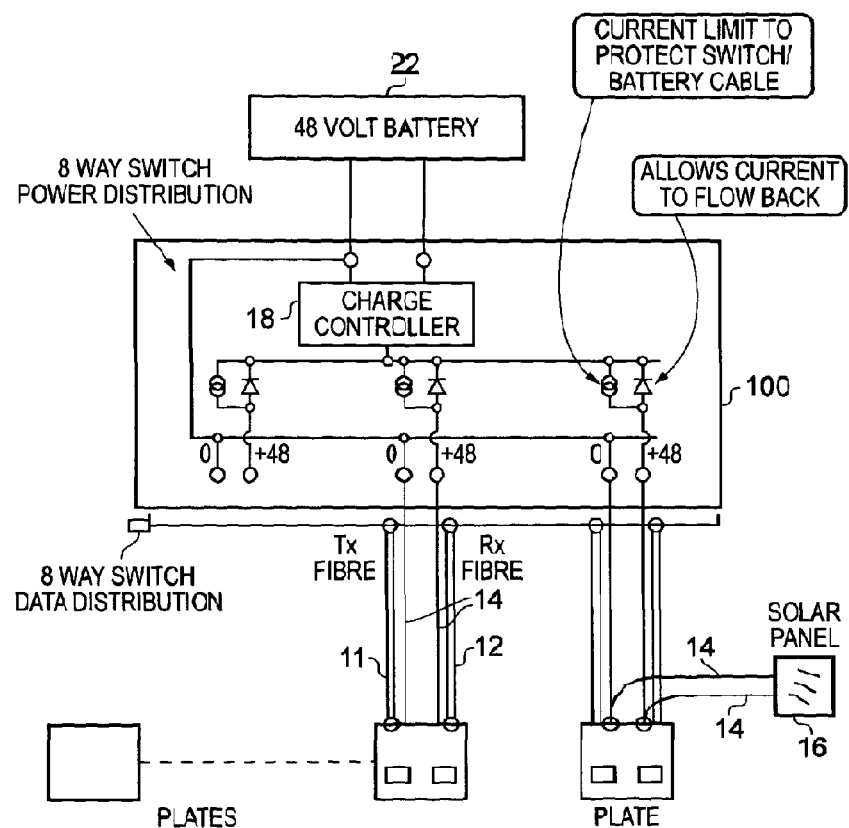
FIG. 2a is a diagrammatical view of an example of network system, receiving its energy supply from a solar panel and with which some devices have been connected.

Referring to the Figures, there is shown in FIGS. 1 and 2a an example of network system 10, receiving its energy supply from a solar panel 16. Components of the system 10 include a cable 11 including a data backbone 12 and an electrical backbone 14. Energy is supplied by solar panel 16 and is modified via an automatic voltage regulator (AVR) 18. AVR 18 may in itself be a rechargeable battery 22 connected to a charger 20. These devices when connected act as an uninterrupted power supply (UPS).

Figure 3:
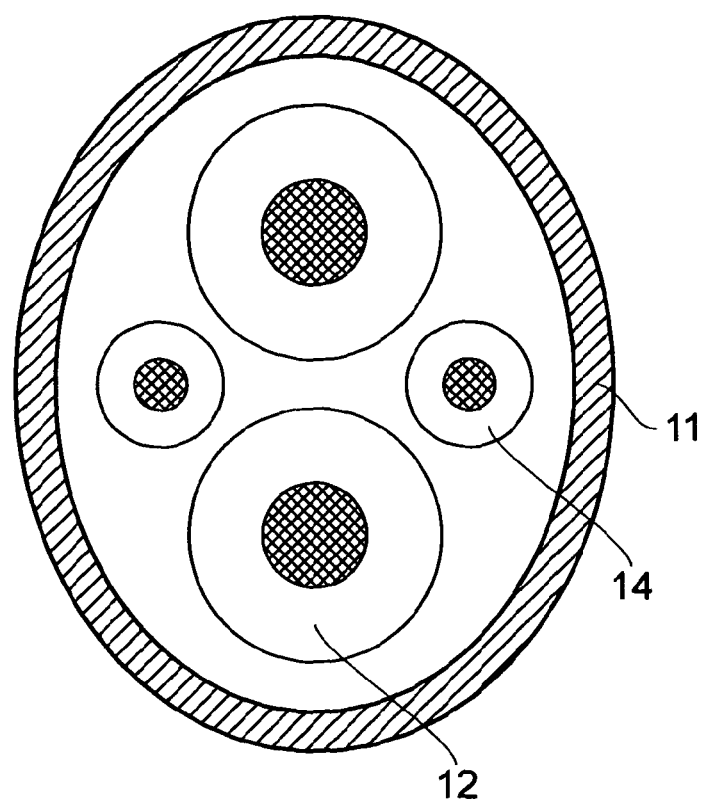
FIG. 3 shows a diagrammatical profile of a cable.

FIG. 2a shows in greater detail a switch with power distribution capability, the switch is depicted as being connected to different electrical power sources FIG. 3 shows a diagrammatical profile of a cable 11. Cable 11 is only one example of a cable profile. It is understood that many other versions of the cable are within the scope of the invention. For example, variation may be made to the material used to form the sleeving, the thickness of the material, the different thicknesses of material around the conductive cabling compared with that around the optical and the orientation of the different pathways relative one to another.

Figure 2B:
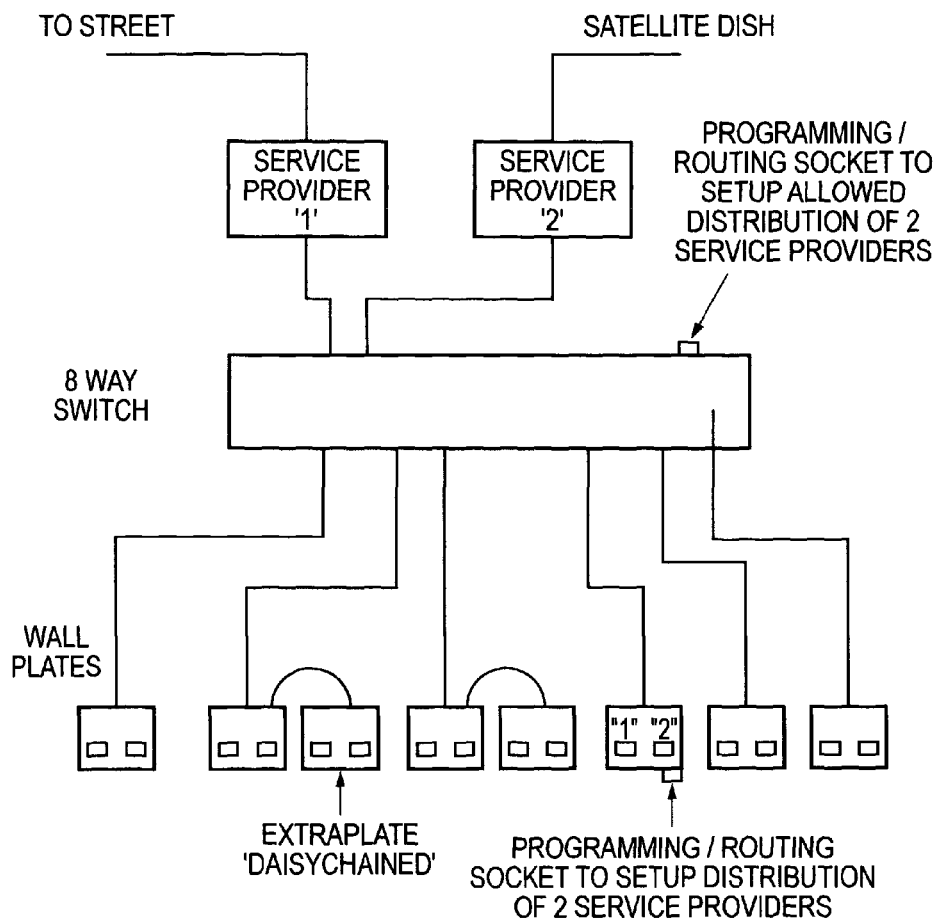
FIG. 2b is a detailed diagrammatical overview of a switch power distributor, showing key features with switch connected to different electrical power sources.
Figure 2C:
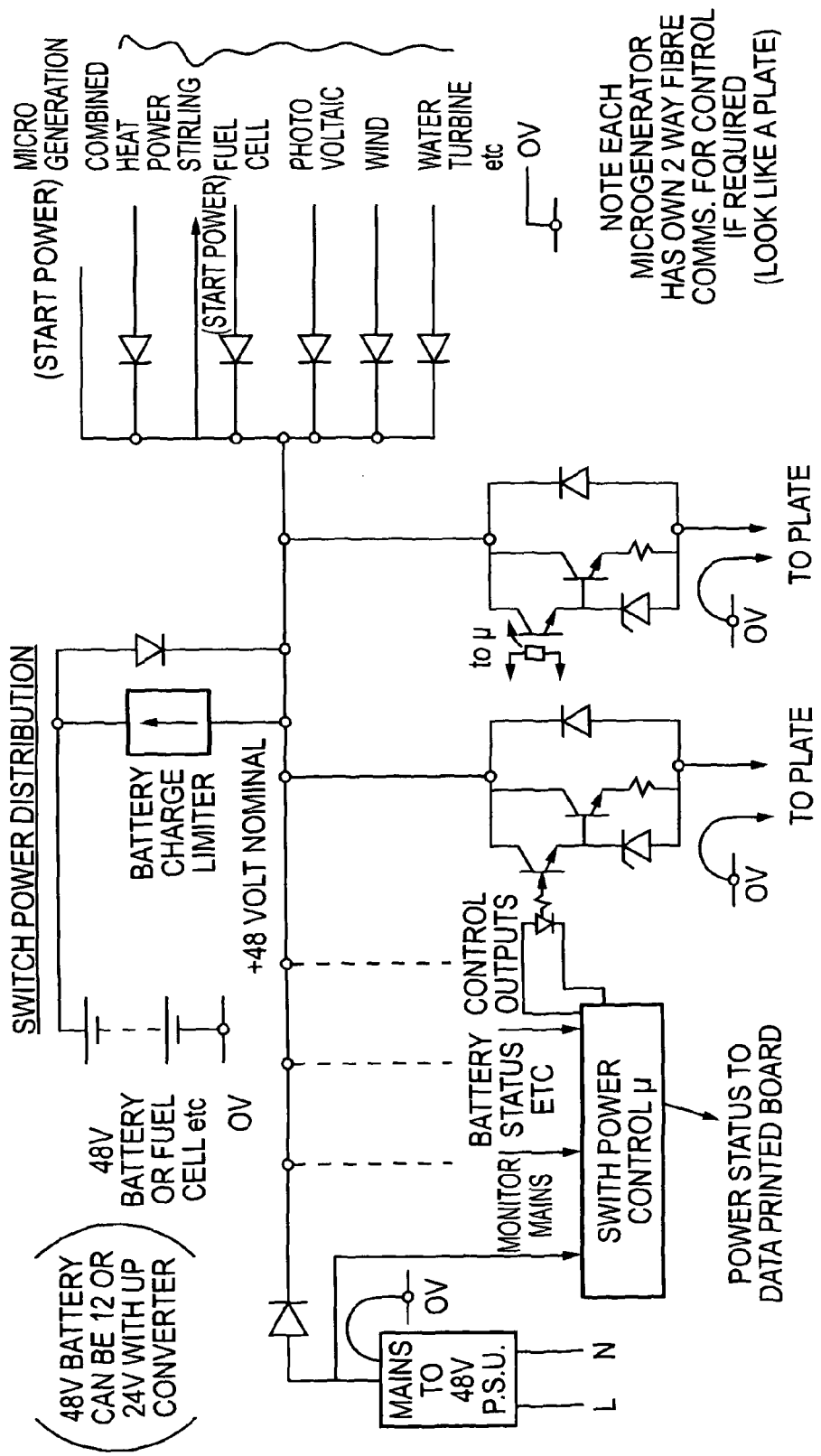
FIG. 2c is a detailed diagrammatical view of a switch power distributor.

For ease of description, reference will be made to the embodiment shown in FIGS. 2b and 3.

Figure 4:
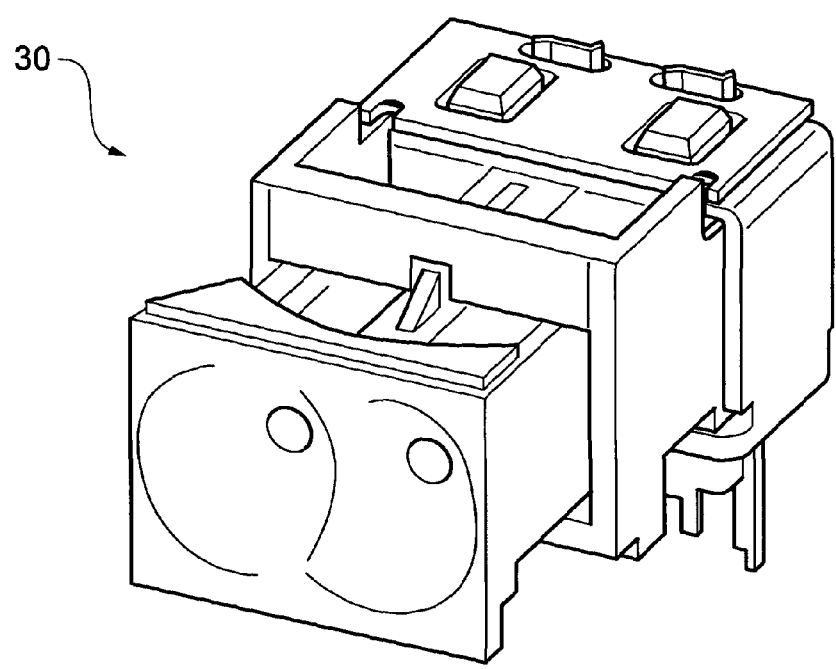
FIG. 4 is an overall view of one example of a cable connector and shows a socket formed integrally therewith.

A connector 30 is shown in FIG. 4 for connecting to cable 11 and forms an optical path 12 and electrical path 14 so that simultaneous contact with the respective optical and electrical pathways may be made in a junction box, shown in detail in FIG. 2a.

In use connector 30, for example as shown in FIG. 4, engages with cable 11 so that simultaneous connection is made to the optical and electrical path. The connection mechanism, which may be in the form of a pawl, catch or a one-use connector, ensures that once properly connected to the cable the connector does not inadvertently detach therefrom.

An end cap (not shown) is optionally provided to close and seal optical and electrical ports of the connector, when not in use as a socket. In a particularly preferred embodiment a connector further includes a latch.

Connectors enable a multi-core cable to be inserted so that both an optical and electrical connection is made. The connector includes an optical index matching material, which may be a liquid or a gel or a liquid that hardens into a solid plastics material, so that optical coupling can take place. The amount of loss of signal that can be tolerated is much greater than that acceptable in conventional optical communication networks, principally because there are relatively modest demands on signal to noise.

Alternatively cutting the multi-core cable reveals ends of the fibre optical cable and these can be inserted into a suitable connector, for example fitted with suitable prisms acting as double sided mirrors and arranged to permit a signal to be launched into another optical fibre as well as into a device or peripheral or indeed a further optical fibre.

It is understood that optical signals may be multiplexed and therefore the network may be used to communicate data instructions—eg from a PC to a printer and/or directly or indirectly communicate signals from the Internet and/or a signals derived from multimedia devices such as digital television, satellite television from satellite dish 70 and digital radio from antenna 80. Multimode fibre may be used to achieve this.

In addition to the aforementioned embodiments the invention facilitates the use of devices that communicate and cooperate with one another and other peripherals over a network to create integrated systems.

An example of such a system is one which includes a television or satellite tuner connected over a network to an intelligent display, keyboard or some other peripheral. A personal computer (PC) 50 is ideally configured to oversee and control the distribution of video data over the network. Thus the network is able to combine discrete system components to form a usable system for handling data as well as one which is able to supply power for the peripherals.

Other components, that may be incorporated into a system, include: digital audio broadcasting (DAB) tuners, terrestrial digital and satellite TV Tuners and (Hard Disk) storage, set-top box audio speakers, close circuit TV cameras, microphones, doorbells and infra red (PR) sensors Ideally the connector is in two parts: a female portion having an insert for receiving peripherals and connector end points and a male connector for cables. In use the system, which is hereinafter referred to as 'power and fibre' (PAF), is able to connect a transceiver device, which is ideally located in the female connector, to the system so as to facilitate transfer of data traffic. Ideally this also connects power to the female connector so that components can receive electrical energy in order to operate.

The male connector is preferably already fitted to a cable connected to a consumer product, appliance or device, for example by the manufacturer. In addition an installer may attach a suitable smart switch, so that the appliance/device may be used with a junction box or other device in an existing power circuit or supply.

The use of intelligent plates in this network system means that all the data routing is done in software by circuitry at each end of the cable and consequently there is no need for a patch panel to route individual signals to each plate as is required in a passive system whether it is carried by fibre or conductors.

The term plastic optical fibre (POF) is used to describe the medium over which the data in the Network is carried. The envisaged system also carries power over the included conductors. The network data does not have to be over POF, and the intelligent plates could be created use conductors for both data and power and that they are powered by Power Over Ethernet (POE) protocol. The advantage of this is the network system so described does not require a patch panel at the 8-way switch end and the POE provides the power required by the active plate circuitry.

Each plate may have its own individual identity, such as an IP (internet protocol) address so that data may be routed to it, for example from the Internet, so that its location may be placed at a known node in a system. By incorporating a processor, local intelligence and remote programming is achievable from a remote facility, for example via wireless Local area network (LAN), via a mobile telephone, using a global positioning system (GPS) or via an Internet interface. Thus it is appreciated that peripherals, devices or appliances may be controlled and monitored remotely.

Local connection for programming may also be provided, for example via an I2C (inter-integrated circuit) interface to an electrically programmable erasable programmable memory (EPROM). This local connection is a connection via a socket mounted on the side of the plate or on the 8-way switch. The programming is performed by a routing programmer plugged into this socket.

The typical rating of the standard copper cable in the conductor/POF hybrid is 3 Amps and has a surge capability to provide typically 6 Amps for a short surge period if required. Cable voltage is in the range of a few Volts, typically 5V, provided current drawn is low. The standard system voltage is 48 volts which at 3 amps gives a maximum continuous power rating of 144 watts if that amount of power can be supplied by the 8-way switch system. Power rating could be higher than 144 Watts if the separated extra low voltage (SELV) of 60 volts ripple free DC restriction is not needed, for example if high power is required and safety considerations and legislation is met. Greater power may also be transmitted by increasing the conductor size in the hybrid cable while still retaining the 60-volt maximum.

It is envisaged that higher power requirements may be met by combining different voltages from different sources, eg from batteries, generators, transformers, wet/dry storage cells, photovoltaic sources, wind and hydroelectric sources, combined heat and power sources, Stirling engines, fuel cells as well as more conventional sources. Suitable rectifiers, phase converters and step-up/step-down transformers may be provided in order to achieve this local power generation facility, so that an uninterrupted power supply (UPS) is available.

In additional to the use of copper as a conductor of electricity, it is also appreciated that over relatively short distances, copper can act as a relatively reliable, broadband and fast data bus in excess of several Megabits/second. The copper cable can therefore be used to transfer even more data which could be utilised to further increase the data transfer rate of the network. The DC and the data are separated by using series inductors at each end of the conductors.

Further variations to the invention may be made for example by using a single fibre optic core rather than a dual core of 'POF' cable as splitters may be used to split optical cables to two or more end locations.

Power—typically 48V—is supplied to local devices via the copper cores in cable and as discussed enable a low voltage domestic bus to supply a plurality of low energy devices. Whilst such a system is not intended to power high current drawing devices, such as heaters, toasters or kettles, the fact that a sizeable proportion of domestic and office equipment may now be powered and controlled using the invention, results in a number of benefits. Some of these are discussed below.

Intelligent systems have the facility for so-called load shedding, which occurs when a non-critical device is switched off (or placed in a low current standby state) so as to provide priority to another device. For example, an intelligent system might monitor (and even know) that the internal temperature of a fridge has recently fallen to just below the minimum threshold and so turns on a motor to pump coolant around the refrigerator. However, in another room, a printer is about to be used to print a recently sent document from a PC over the network which is likely to take 1 or 2 minutes. The network is however running at full current capacity and there is no additional supply available. Therefore a decision is made in a controller to momentarily switch off the refrigerator motor and power up the printer; print the document; and then switch the printer to standby and finally switch on the refrigerator motor.

Likewise prioritisation of data can be achieved by way of programming so as to reflect data priority and/or urgency or quality of service. Often telecom providers are contractually obliged to provide a telephone that operates in the event of a power supply failure. They have no obvious facility to do this with the increasing use of optical fibre from the street into the home. The invention thus provides both backup DC supply for the house, as well as a facility for the service provider. This avoids significant cost to the telecom providers as well as considerable overall economy by having a multi-purpose system.

A battery backup prevents this by reducing voltage and plates (nodes) that are deemed low in priority. Alternatively different priorities can be switched selectively so as to extend battery backup period and still retain key services available or on standby.

This same principle may be achieved by reducing voltage and/or by sending data directly as to how to power up again, to automatically reduce power consumption of all equipment/peripherals either by removing their power directly or by issuing them a command to power down/off.

So-called up converters, when included in a front plate, or may be plugged into the front plate or powered off a spur accessible from the front plate can be arranged to convert 48 Volts to either 120 Volts or 230 Volts (DC or AC) and this can be used to operate other domestic equipment, provided there is sufficient current. Again these may be controllable if required by the plate/node.

Down converters to front plate may be used to convert 48 Volts to 12, 5, 3.3 Volts or indeed any other voltage and the down converters may be controllable if required by the plate.

The power can flow in either direction in the cable connected to the plate. This is facilitated by the 8-way switch 100, shown in FIG. 2a, having a current limit facility for the current drawn from the switch and a 'diode or' wiring connection for current to flow into the 8-way switch from the plate. Although reference to an 8-way switch has been made, it is understood that the invention is suitable for any number of ports or gates.

A power supply unit (PSU) is arranged so as to have a multi power supply, in which redundancy is possible. It is also understood that the POF system not only provides power distribution but also enables telephone signals to be distributed to wall plates over copper conductors.

Power extenders may be used to distribute power and data and these may be in the form of 1 to 2; 1 to 4 or 1 to 7 extenders. Expansion is limited by data rate and chip set issues.

Extrusion/sheathing may have pockets to allow the fibre and wire cores to move slightly in relation to a sheath or sleeving. This aids flexibility, permitting the cables to be bent. Cables may be cut in such a way that the sheath provides insulation to the copper conductors, but also permits fibres to be exposed at the point of termination.

Another feature of the system is that a great deal of cable, flexes and other wires are removed; thereby reducing the amount of clutter often associated with work stations, audio systems and home entertainments systems.

Telephone/intercom services over copper cores of network are achievable using the system and therefore use of current analogue telephone handsets and existing peripheral equipment such as telephone answering machines can be achieved using the system.

Figure 5:
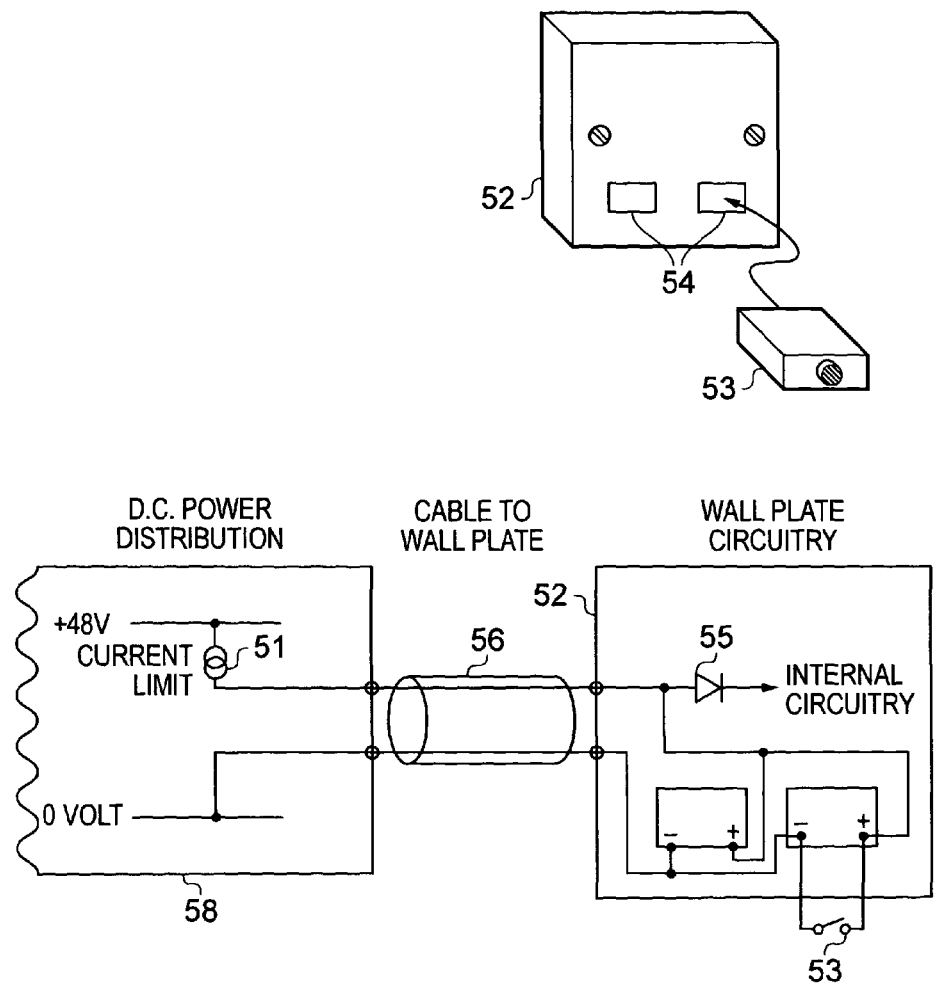
FIG. 5 is a diagrammatical view illustrating plate reprogramming using a supply shorting link.

FIG. 5 shows in greater detail the use of a short circuit on a DC bus to the plate to effect reprogramming or resetting of a state, status or program on the plate. The connectors 54 on the front of the plate 52 are directly connected by hybrid cable 56 to the DC distribution assembly 58. This has a current limited output 51 so as to tolerate inadvertent shorting with no ill effect. More specifically the design of the DC distribution assembly is such that a short on one of its DC outputs has no effect on the other outputs. Use can be made of this feature to perform some functions such as resetting software in the plate.

A preselected plug 53 provides a short circuit between the two DC conductors effectively removing power from plate electronics. Diode 55 prevents reverse current flowing from the internal circuitry of plate 52.

Upon removal of the short, the plate electronics re-boots or restarts its software and switches on hardware to their initial conditions. If the plate has been reprogrammed, using an external influence such as a programmer or by data sent along the composite cable itself, then this short circuit mechanism can be used to reset and reboot hardware and/or software.

Figure 6:
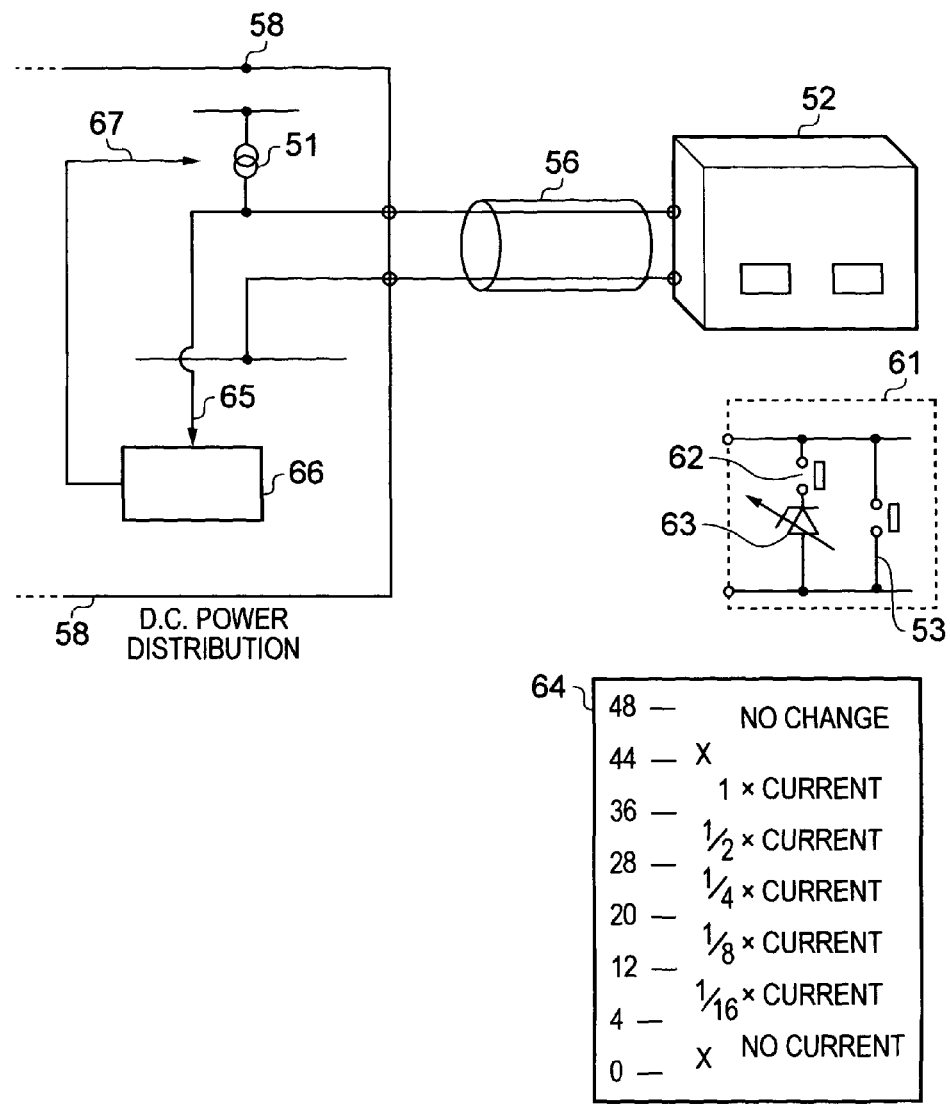
FIG. 6 is diagrammatical view illustrating return information to the power supply distribution unit by use of the supply shorting link.

FIG. 6 shows in greater detail the use of a short circuit (or reduced voltage clamp) 61 on the DC bus to the plate to provide a return information facility to the power supply distribution at the switch end. This can be used to initiate alternative modes as well as act as a channel for feedback signals, of such variables as temperature or levels of gas or smoke.

The presence of a short circuit 53 or a reduced voltage 62 at the plate end can be detected by detector 65 at the power distribution assembly 58. This can be used to alter current settings 67 of the power distribution assembly itself. The actual values depend on the capacity of the power distribution unit actually being used. However, these can be set by a simple pattern of information 64. For example, a one second short followed by a one second pulse of 24 volts, followed by another one second short may be decoded by microcomputer 66 as setting a channel to ¼ full current output. A code system, similar to Morse Code, Hexadecimal, Binary or capable of some other relatively low Baud rate, may be used to transmit data even when there is power outage, failure or fault.

Figure 7:
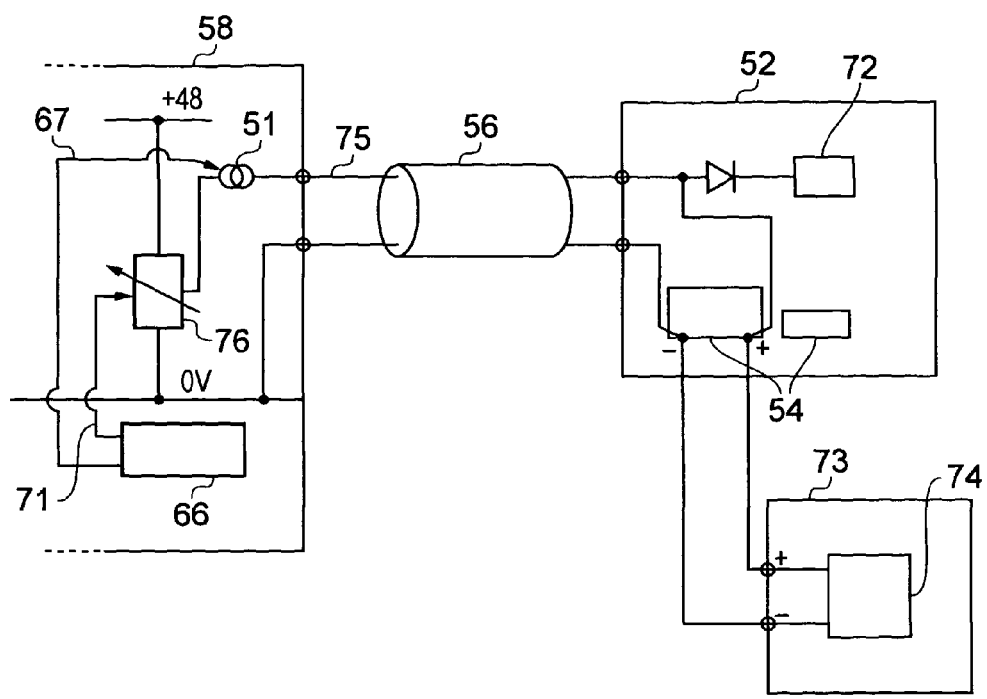
FIG. 7 is a diagrammatical view illustrating use of reduced voltage switching of plates to shed load and/or enter quiescent state.

FIG. 7 shows in greater detail the use of a reduced voltage 75 on DC supply 56 to plate 52 to effect load shedding and/or enter a quiescent mode. The DC power distribution assembly 58 provides a unique current 67, 51 to each plate as required. The voltage of this output is normally at the nominal 48 volts, unless the rated current is exceeded. However, this voltage could be reduced 71, 76 or set to zero in order to shed load or to force the load on this node to enter a quiescent mode. The plate 52 may be provided in the form of an intelligent version which can measure the supply voltage 72 and adjust its state accordingly. Alternatively a load 73 can be connected to the plate 52 and can react to the reduced voltage available 74 and act accordingly.

Figure 8:
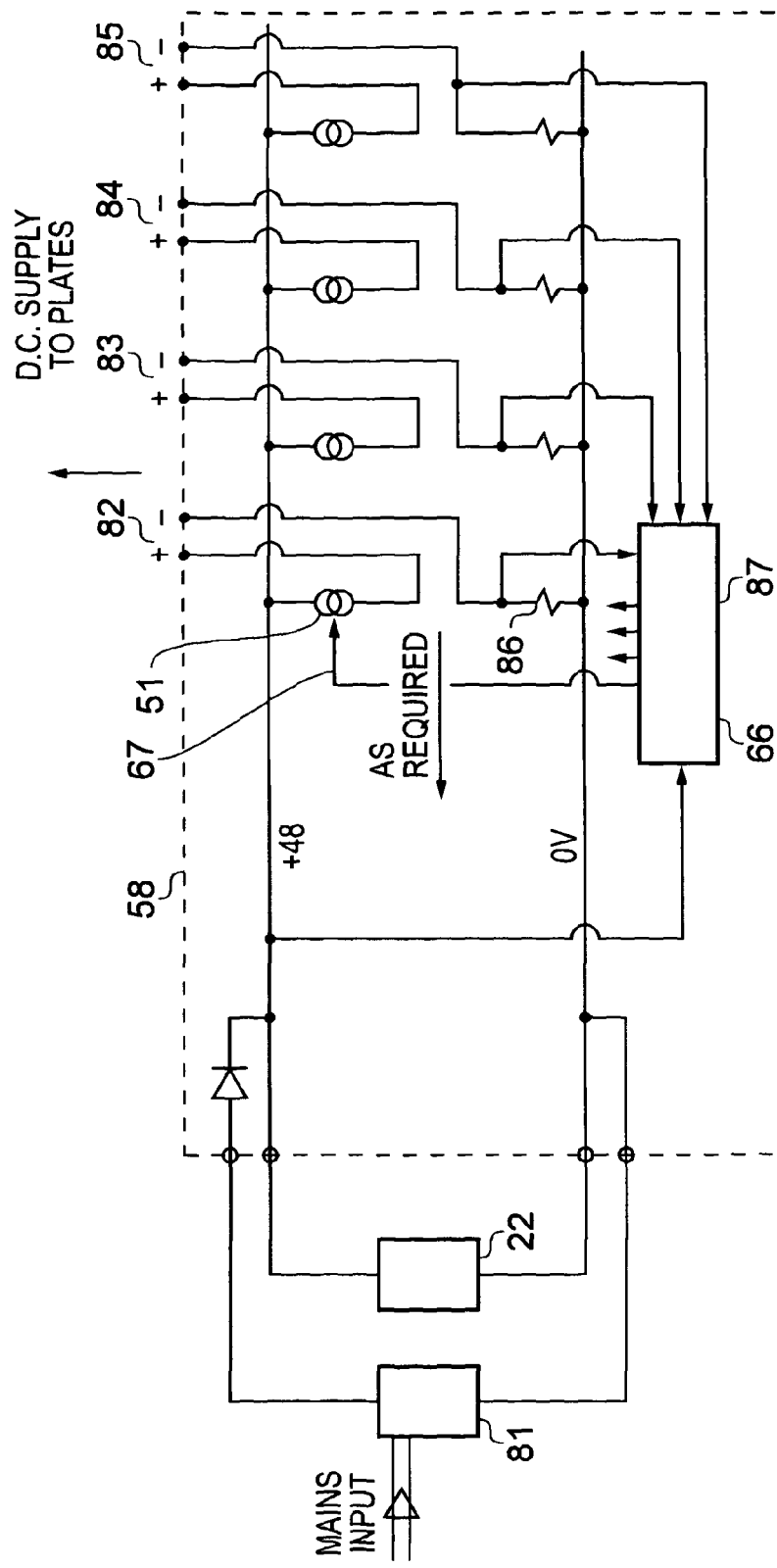
FIG. 8 is a diagrammatical view of current monitoring at a supply distribution unit and shows current drawn by individual plates and their aggregate value.
Figure 9:
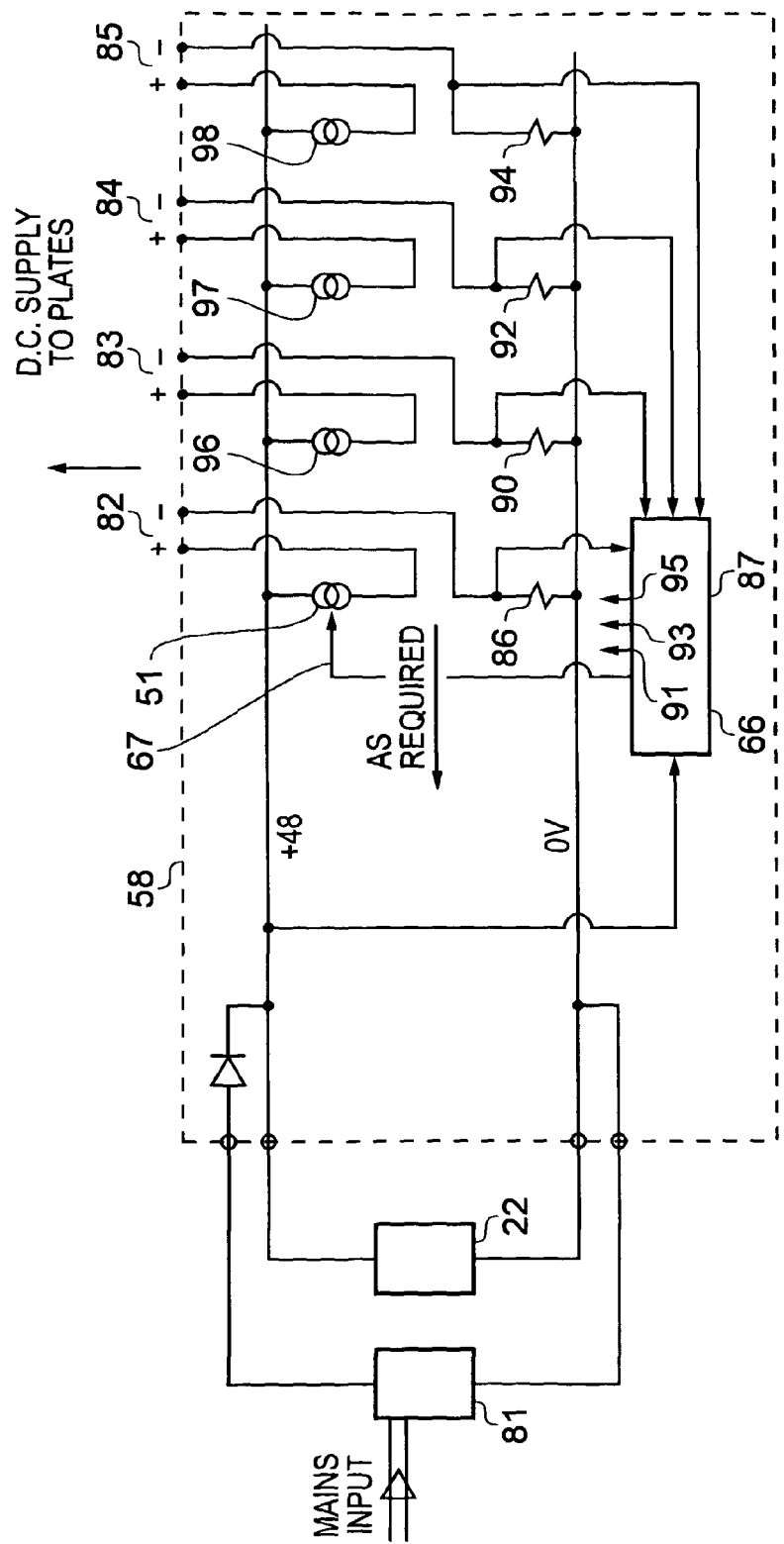
FIG. 9 is a diagrammatical view showing adjustment of available current at the supply distribution unit to each of the individual plates and their aggregate value.

FIGS. 8 and 9 is a diagrammatical view of an arrangement for current monitoring at a supply distribution unit and shows current drawn by individual plates and their aggregate value in greater detail.

The current in each plate cable 82, 83, 84, 85 is monitored 86, 90, 92, 94 and summed 66. In the event of a mains power supply failing 81 or the battery voltage 22 dropping, the various plates can be progressively "de powered" to give optimum quality of service according to a pre programmed sequence 87. This pre programmed sequence may be fixed, adjustable locally or adjustable remotely, for example via an Ethernet connection itself.

Monitoring the currents of the loads also gives information as to the operation and status of the connected loads and the system may be used to collect data relating to usage, instantaneous power consumption and to relay this data (which requires only a narrow bandwidth as the Baud rate of such data is so low) over existing power supplies.

FIG. 9 shows in greater detail the operation of the power distribution at the switch end. The current limit in each plate cable 82, 83, 84, 85 is adjustable 67 and 51, 91 and 96, 93 and 97, 95 and 98 to match the current requirement of each plate and associated load attached to it. The request for this current value can be communicated to the power supply distribution in a plurality of ways including: by way of a short circuit clamp or a reduced voltage clamp at plate end or by using the Ethernet or by way of a relatively low frequency signalling arrangement on the DC lines themselves.

It could also be achieved by gradually increasing voltage and current to a plate node to determine load setting requirement.

Figure 10:
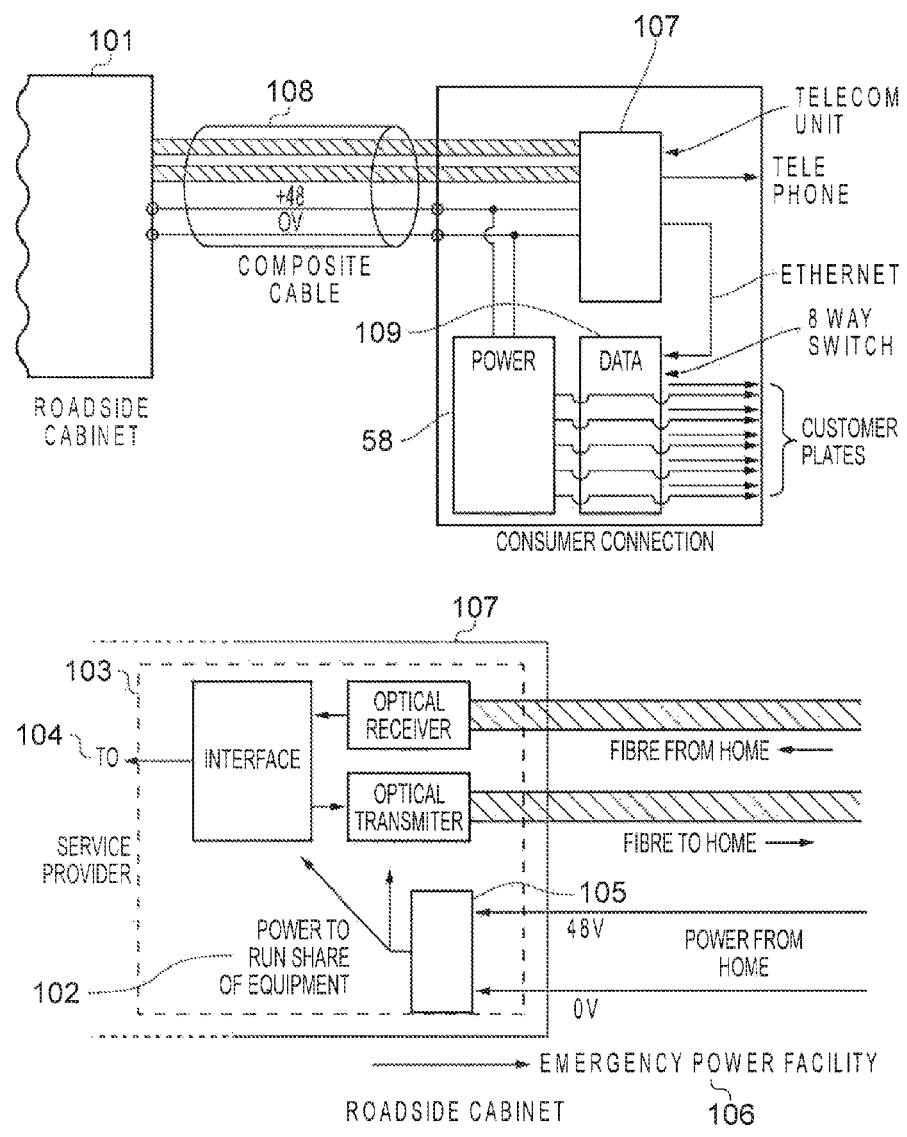
FIG. 10 is a diagrammatical view illustrates how power is provided and controlled and fed back to a location at a data hub remote from the distribution unit.

FIG. 10 shows in greater detail the use of the composite cable to transmit power from the power distribution 58 at a "switch end" back to the so-called "road end" cabinet 101 so that the customer pays for the power required 102 to support access node 103 on the data network at street level 104.

There may be a requirement for the customer to provide power to the road end cabinet as the cost to the service provider could be prohibitive to provide an 'always on' optical connection to each subscriber for which the service provider may not be adequately recompensed. The road end cabinet connection 105 could be enabled by power from the service provider for incoming calls or data and enabled by power from the customer for outgoing calls or customer requested incoming data.

It is appreciated that this cable could be used, in an opposite sense to its intended purpose, so as to make available limited power from the service provider into a customer's system for emergency operation 106 of a critical facility, such as modem or communication device. This facility could be to power electronics to provide basic interfacing 107 between the incoming optical system and a conventional telephone. Alternatively the arrangement depicted in FIG. 11 can be adapted for use between the roadside cabinet end and the customer end. The power cable would become the phone transmission medium. In both these cases this solution satisfies "telco" by providing a telephone link that operates in the event of a mains power failure.

This powering of the cable 108 can be used as a mechanism to enable the optical link thus providing a considerable power saving of powering down the optical link when not in use. This assists in reducing overall telecom network power consumption by disabling every customer connection node 103, 107 when it is not in use.

Figure 11:
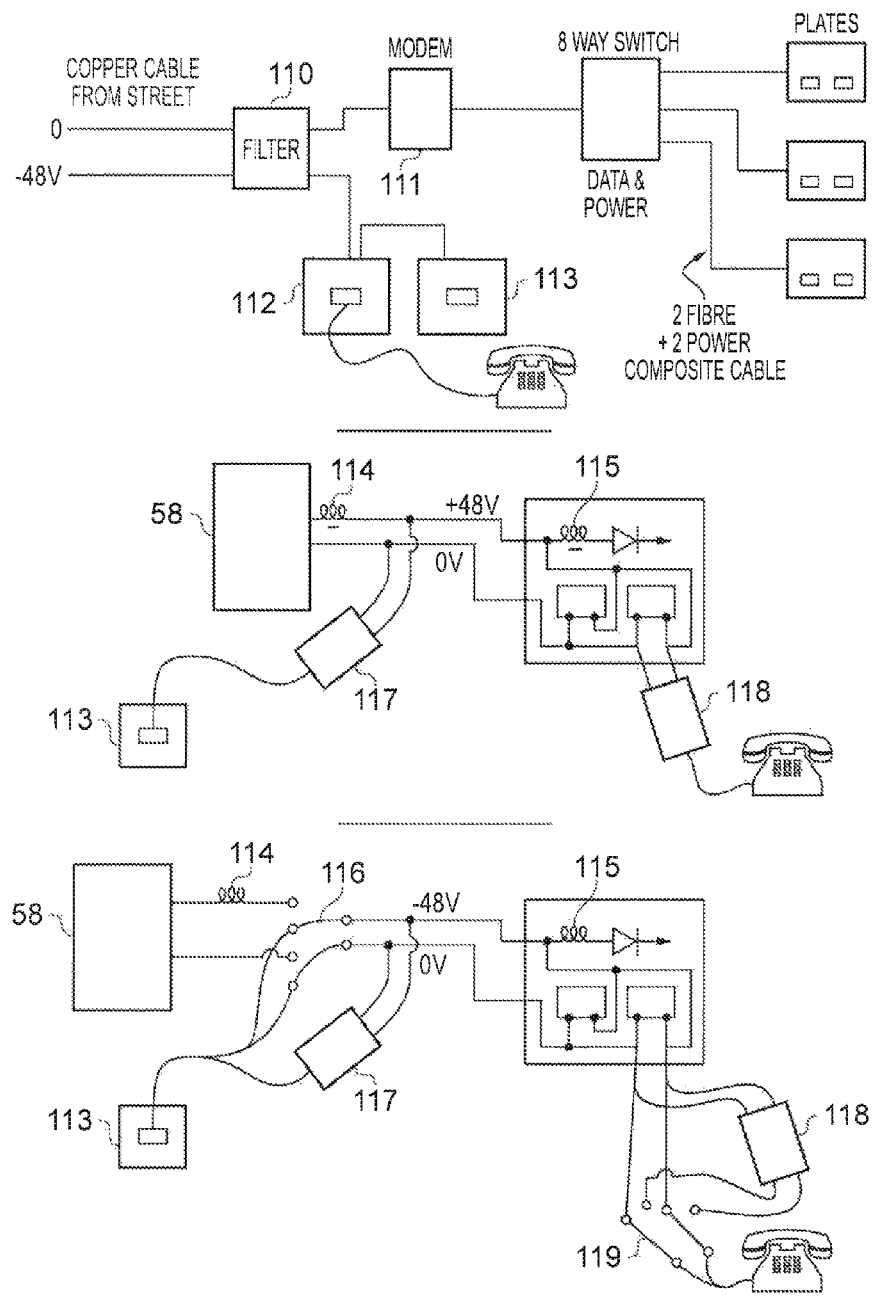
FIG. 11 is a diagrammatical view and shows how existing wiring is adapted for use with wall plates.

FIG. 11 shows in greater detail the use of the composite cable and total system to allow conventional telephone equipment to be used while still allowing emergency direct telephone connection in the event of power failure. It is appreciated that an additional dedicated cable pair, for the use by the conventional telephone system, may be included in the composite cable.

As mentioned earlier, the requirement from "telco" providers is that the standard telephone can be supported in the event of a mains power failure to the property where the phone is installed.

The diagram FIG. 11 shows one way in which this achieved under normal conditions, or in the event of mains failure but DC bus still operational and finally in the event of complete failure of both the mains supply and the DC bus system.

The system is designed to allow for the "telco" provide conventional two wire connection at ground and −48 volts nominal 113. Under normal conditions this is converted by converter 117 to a modulation of the +48 volts that is distributed to all the nodes in an installation. This modulation is isolated from the DC power loads by the use of a series inductor 114, 115.

In the condition of failure of the +48 volt supply, the two wire connection 113 is made to two copper conductors of the distributed power by a change over relay 116. The polarity of "Telecom" signal is −48 volts and is prevented from entering into the plate circuitry by protection diode 115. The interface connector fitted between the standard telephone and the plate connector also contains relay 119 which reroutes the telephone connection around demodulator 118 in the interface. A perfect connection between the telephone and the Telecom provider now exists powered by the Telecom provider and meeting all their loading and safety regulations.

The aforementioned system also supports the use of cordless telephones by providing the power required to maintain the base station and recharge the cordless telephone when placed in a suitable recharging point.

The system supports voice over VOIP using the combined optical data and power distribution in the usual manner.

This concept of gradual isolation of the critical data from the system under system failure conditions could also be applied to other functions such as making a security door become unlocked in the presence of fire for example.

Figure 12:
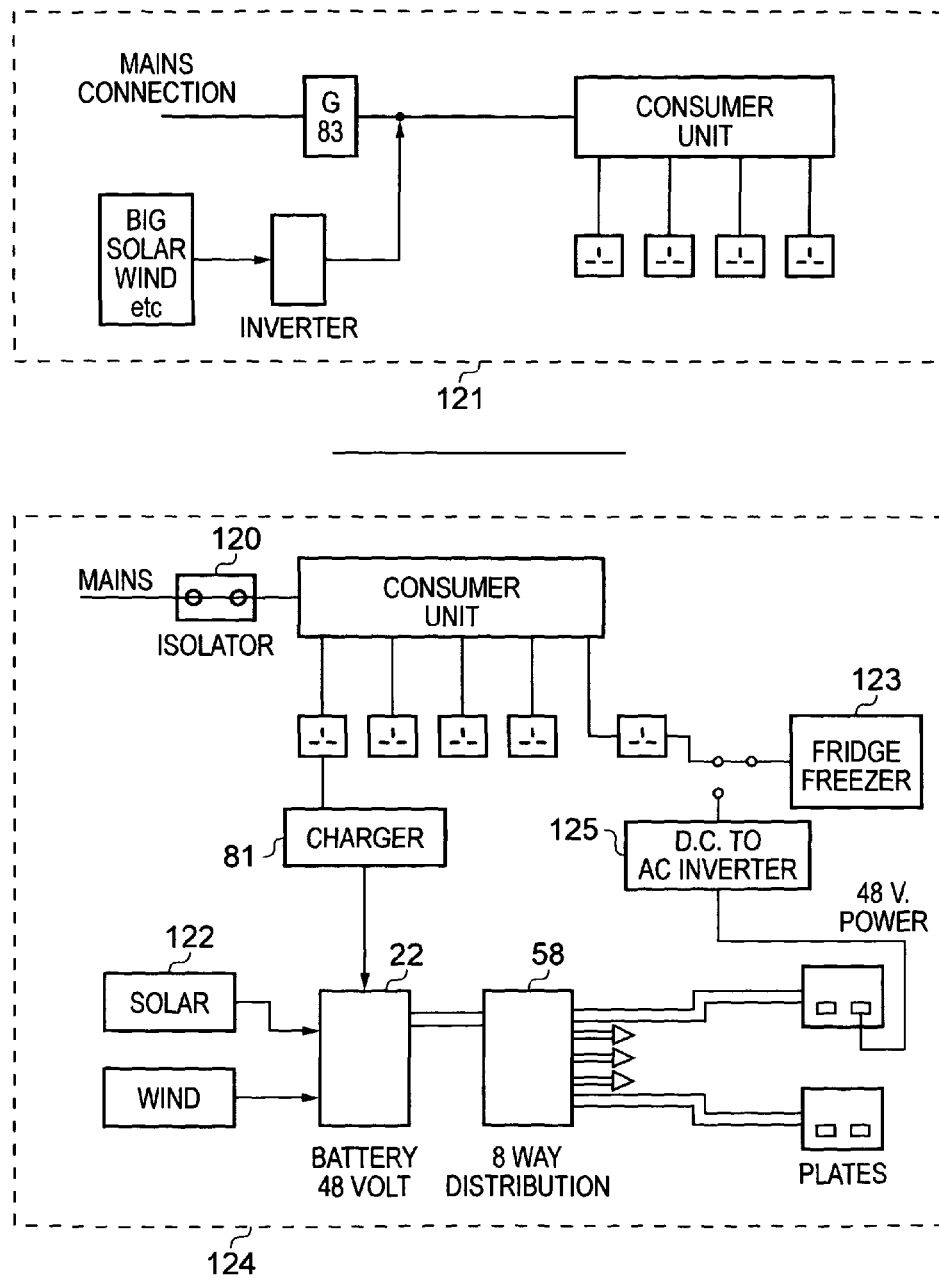
FIG. 12 is a diagrammatical view of implementing 'green' energy saving measures by the control methods unique to this system.

FIG. 12 shows in greater detail the way the system embraces 'green' energy saving issues inherent in the concept. The concept of having a house wide low voltage bus system (inherent in the design of this distributed data and power system) as well as the conventional domestic mains system, allows several novel functions and arrangements to be created 124.

The opportunity now arises to isolate the house by way of an isolator 120 completely from the mains supply when the domestic load requirement is minimal. This can be set to occur automatically, for example at night time or when the premises are unoccupied. This feature has the advantage of disabling all electrical "parasitic" without requiring any significant effort to turn off several devices in a property.

It is also considered by some authorities that unnecessary exposure to mains frequency fields has detrimental health implications. There is a growing belief that the proliferation of radio frequency transmissions and also immersion in mains frequency fields is having a significant negative effect on the health of human beings. This radio frequency/electro-magnetic pollution appears to be becoming all pervasive. In anticipation of a system of data and power transmission using fibre, rather than radio or mains borne signalling, and DC rather than AC where possible. The possibility of screening a house from external electro-magnetic fields and turning off an AC mains when not required, would alleviate any effects.

This DC distribution structure also neatly solves issues relating to local generation or micro generation. Virtually all small micro generation systems are not able to support running the domestic load if the mains supply to the property fails 121 represents a standard domestic mains wiring installation with a micro generation source added.

By arranging the micro generation 122 to support a low voltage bus, the problem of islanding, the cost of equipment to implement the standards (G83/1) and the administrative costs of meeting the requirements of G83/1 are circumvented.

It is considered that a DC bus system of a few hundred Watts capability is exactly the kind of load that can be supported easily by micro generation. This kind of load requirement is also exactly what is required for supporting a domestic environment in either an emergency situation, or a night time load or a no occupancy situation.

Such a power supply would run a fridge/freezer 123 (either 48 volt powered or with a 48 to 240 volt dedicated inverter 125), provide power for: some LED lighting, essential communications equipment and security/safety equipment (burglar alarm). It could even provide enough power to operate a gas boiler and circulating pump meaning that a significant level of comfort could be achieved in a power outage situation with a relatively small investment in the DC bus system.

By providing an independent 48 volt D.C. bus in parallel with the conventional mains power 124, environmental issues can be addressed in relation to efficient use of raw materials such as copper. Furthermore, the efficient storage of an emergency energy reservoir, say at 48 volts is achievable and avoids unnecessary conversion losses from DC to AC and back again to DC.

The use of the 48 volt bus itself, to convey low data rate information, allows for very low current and low cost signalling circuitry to be used. This obviates the significant technical issues of mains signalling in terms of unpredictable mains cable and attached load impedance as well as data security and interference.

Direct signalling on the 48 volt bus itself could be used for low data rate cost sensitive applications such as temperature and humidity for whole house control and individual room control.

This 48 volt bus could be further reduced in voltage to say 12 volts for use in the most critical zones in a bathroom using a 48 to 12 volt isolated converter.

Figure 13:
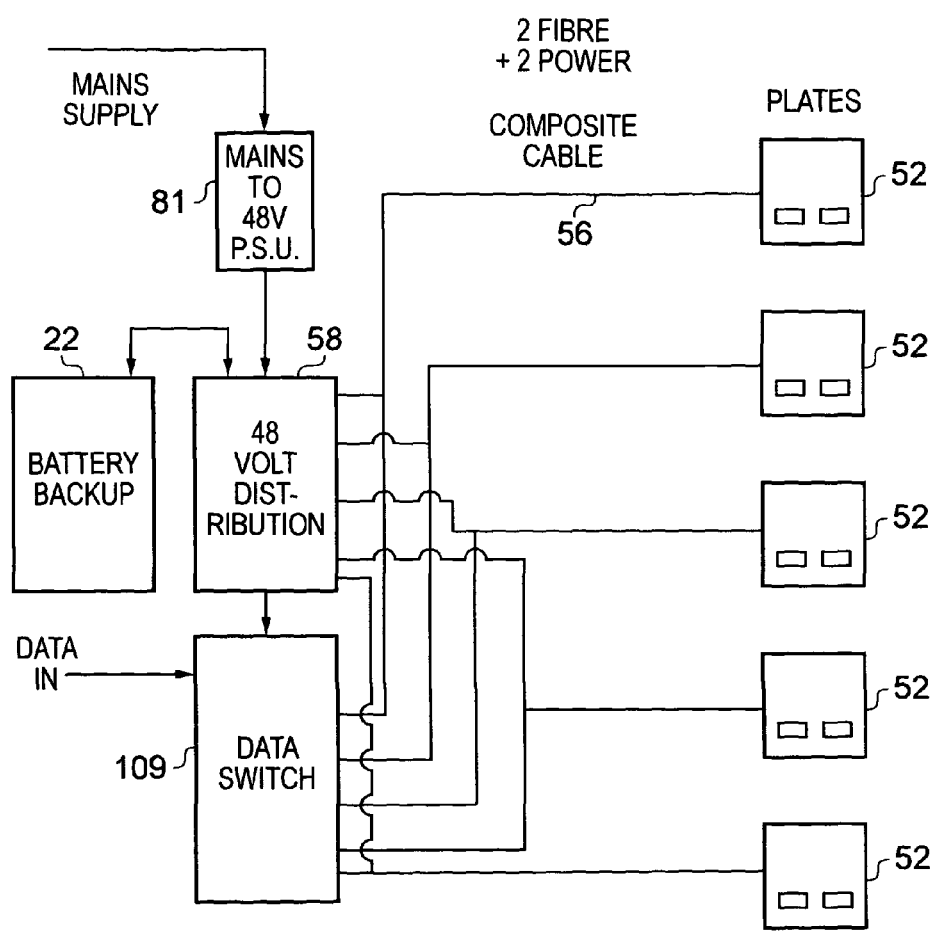
FIG. 13 is a diagrammatical view of the inherent future proofing of the system.

FIG. 13 shows in greater detail the way the system embraces future proofing, recycling and reuse as the core of its concept.

By breaking the system into five basic parts, this arrangement allows for the lowest cost of implementation of the most basic system. The most basic system comprises the 48 volt power supply 81 which via the DC distribution unit 58 powers the switch 109 and the plate 52 by the composite cable 56.

The system can be made immune to short term mains failure by the addition of, at relatively low cost, the battery 22 to provide DC power backup. The battery may be actually 48 volts nominal which can range from 40 to 60 volts depending on its state of charge and technology used. The battery itself may also be a lower or higher voltage than 48 volts nominal and the 48 volts used by the system being generated by an appropriately rated up or down voltage converter.

A typical low power requirement small system could well use a 12 volt lead acid battery and a 12 to 36 volt DC up converter which by sitting the 36 volts on top of the 12 volts would give the 48 volts nominal required. The 48 volt power supply 81 under these conditions could be incorporated into this up converter to provide an integral unit. If multiple batteries are used in series, some provision for charge balancing of the individual batteries may also be provided to ensure long battery life and full charge capability.

The plastic optical fibre used is rated for 100 MHz data rate but is suitable for 1 GHz operation if required. It is recommended that the power/fibre composite cable is routed in a conduit (allowing for easy installation and removal) which allows upgrades or expansion if required. The DC distribution unit 58 and the switch 109 may be upgraded for more distributed power, more outlets and higher data rates when necessary. The existing parts can be reused for lower specification applications or eventually recycled when no longer required.

Plate position 52 may likewise be upgraded for extra specification with the existing part reused for other nodes or recycled.

The system concept is additive with a backbone of fibre and wiring and adding to it. Because of the full two way nature of power, data and control at any point in the system, any function can be located anywhere. This enables the creation of sophisticated functions out of many simpler parts located anywhere in the system. Eg a baby alarm function can be created where, in one room there is a microphone wired via an interface into a plate. This is accessible at any other plate where there is the function of an interface running say a loudspeaker or other visual alarm, adapted to receive a signal from the alarm.

It is clear that these undedicated interfaces could also be used for a multiplicity of other functions at the same time. The microphone could have security uses and the audio output be used for music while the microphone input is not activated.

The system is adapted to allow for convergent technology and technology upgrades while retaining all the other parts that are still providing satisfactory operation.

The key to this is both the use of a single standardised plug, with the capability of combined data, power and control signals; the choice of 48 volts as an optimum voltage for safe and efficient power transfer for the typical loads involved in the system; and to the universal nature of the data and control signals.

Figure 14A:
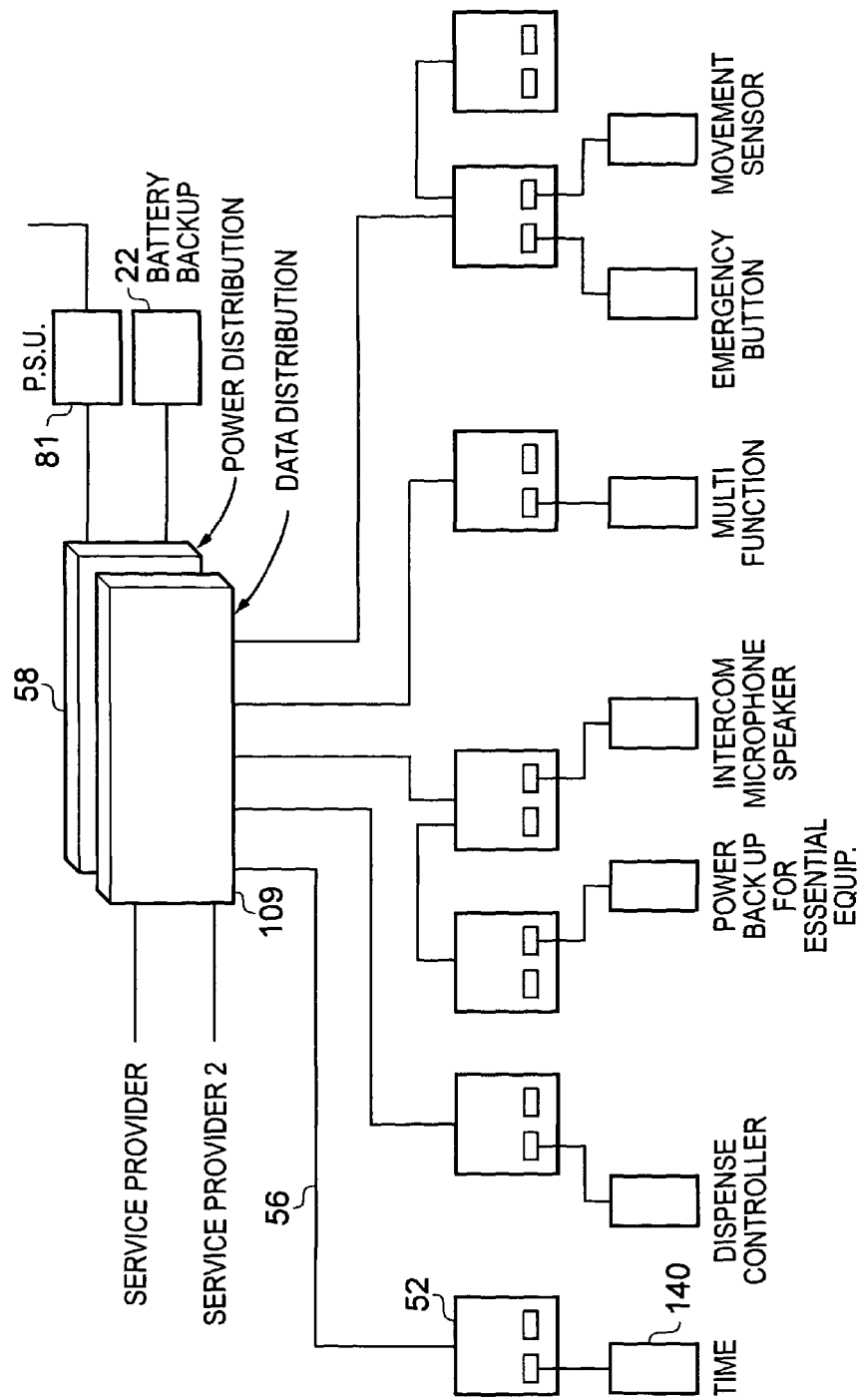
FIG. 14 is a diagrammatical view of the security features of this system.

FIG. 14 shows in greater detail the implementation of intelligent monitoring of occupancy and activity for security and for monitoring and assisting the well being of elderly, infirm or disabled users to enhance their safety and independence.

In the event of mains power supply failure, the low voltage system is adapted for use as an emergency power lighting system at each node 140.

Figure 15:
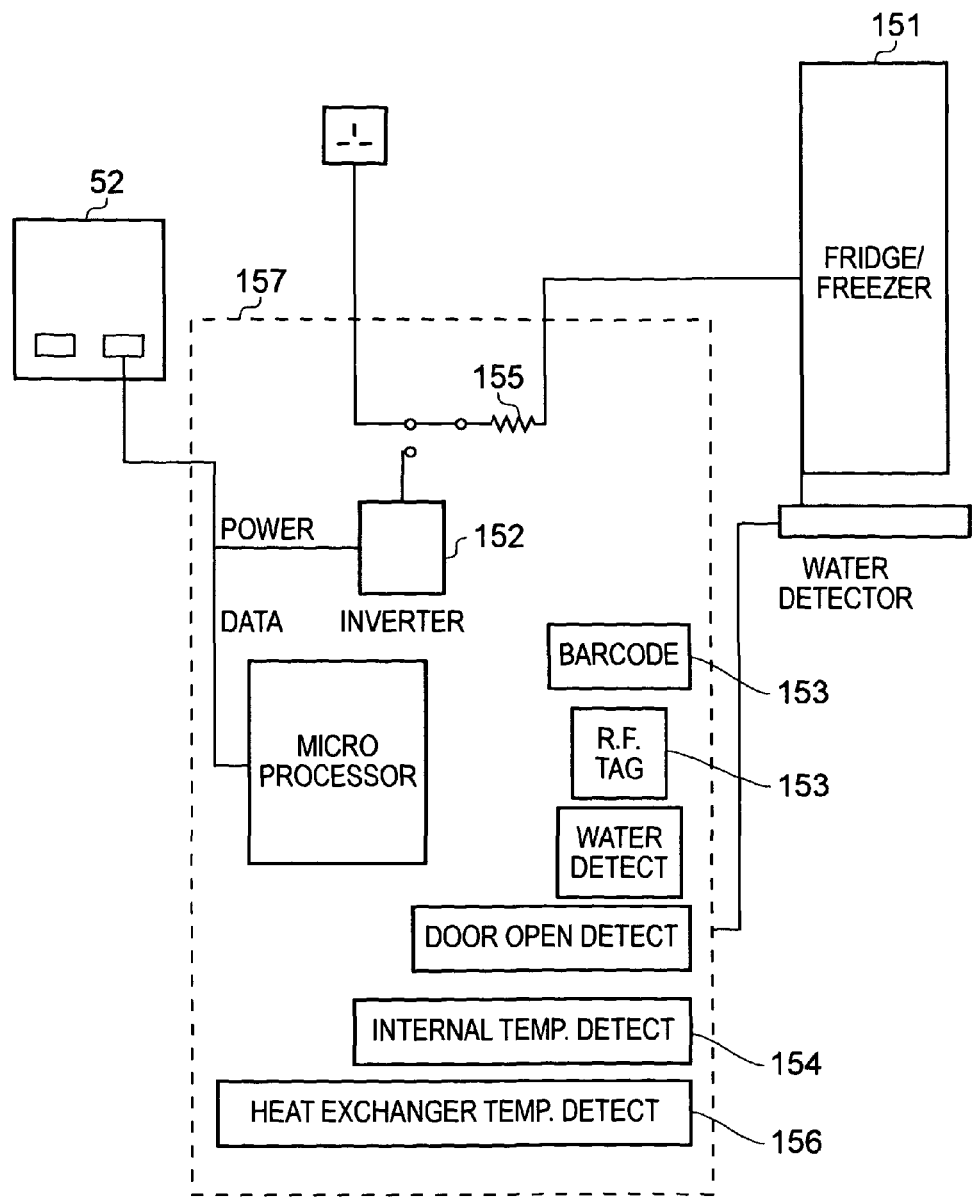
FIG. 15 shows an implementation of improved domestic reliability when the invention is employed applied to a fridge/freezer.

FIG. 15 shows in greater detail an implementation of improved domestic reliability applied to a fridge/freezer 151. Fridge freezer inverter, DC/AC converter 152 or modification to freezer. Contents information 153, operation warning (door open) 154, motor excess current 155, running time 155, heat exchanger blocked 155, 156.

This could take the form of an external unit 157 or incorporated within the appliance in the longer term with a direct plug connection between fridge/freezer 151 and plate 52.

Figure 16:
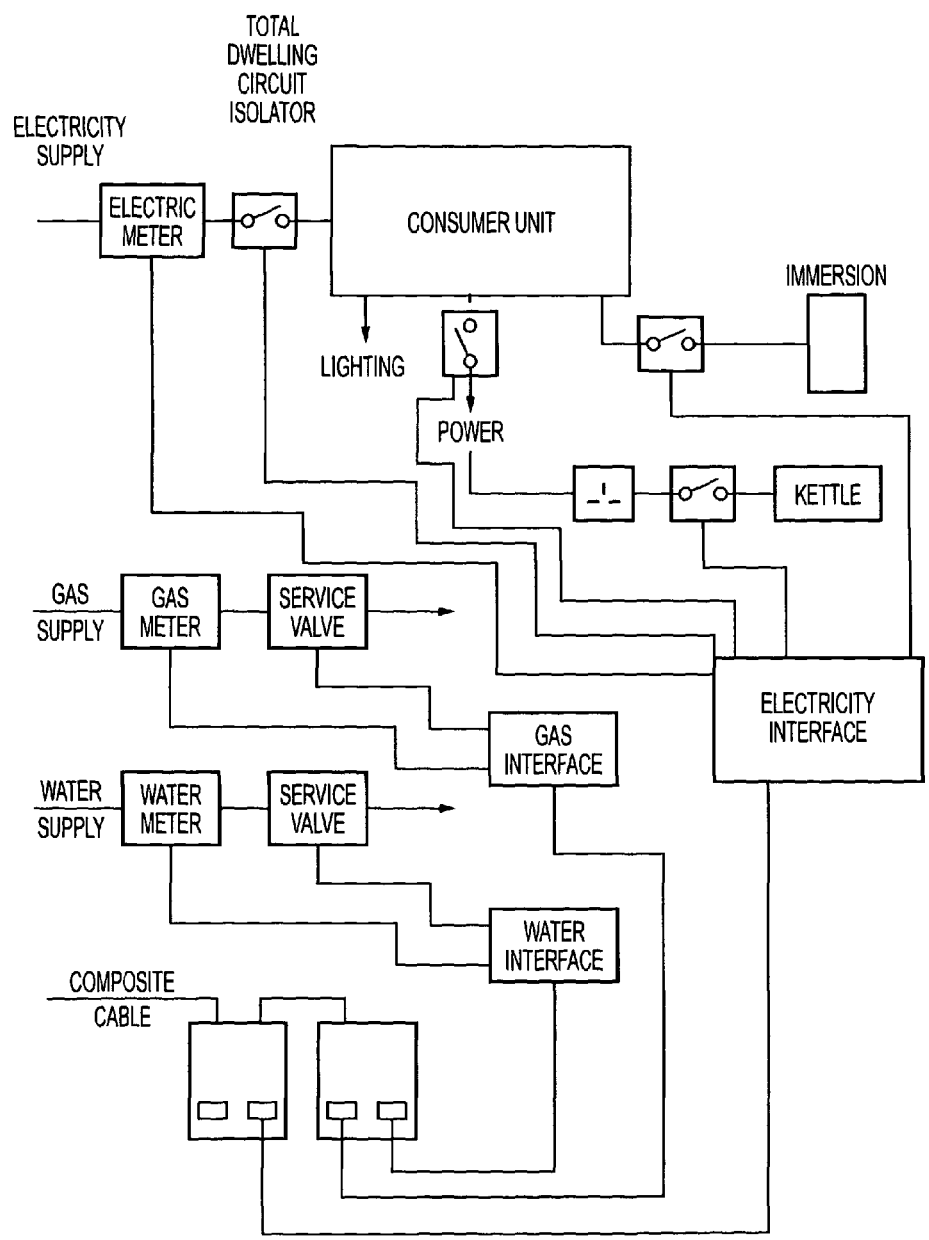
FIG. 16 is a diagrammatical view of the implementation of remote metering by this system.

FIG. 16 shows in greater detail the implementation of remote metering and remote control for load shedding and other purposes. The data bus and system allow for the health monitoring and reprogramming of mains connected equipment.

The separate nature of the low voltage data bus means that the control system is completely independent of the mains power itself. This allows, for example, the electrical utility company to communicate to the dwelling via the data and low power network and allows for remote load shedding of mains connected items prior to a power reconnect. The remote shedding of loads could well relate to a favourable tariff for this reduction in convenience. Thus a remote power supplier or grid controller could remotely disable many heavy current appliances so as to perform "peak lopping" of demand.

Gas and water metering and control may be independent of the provision (it may be disconnected or not present at time of meter reading or control) of electricity on the consumer side. An arrangement can be made with the "telco" service provider to supply limited power via the hybrid cable to the property for the express purpose of enabling this facility.

The distributed nature of the combined data and power system would also allow for environmental conditioning, consumption monitoring and control on a room by room basis.

Figure 17:
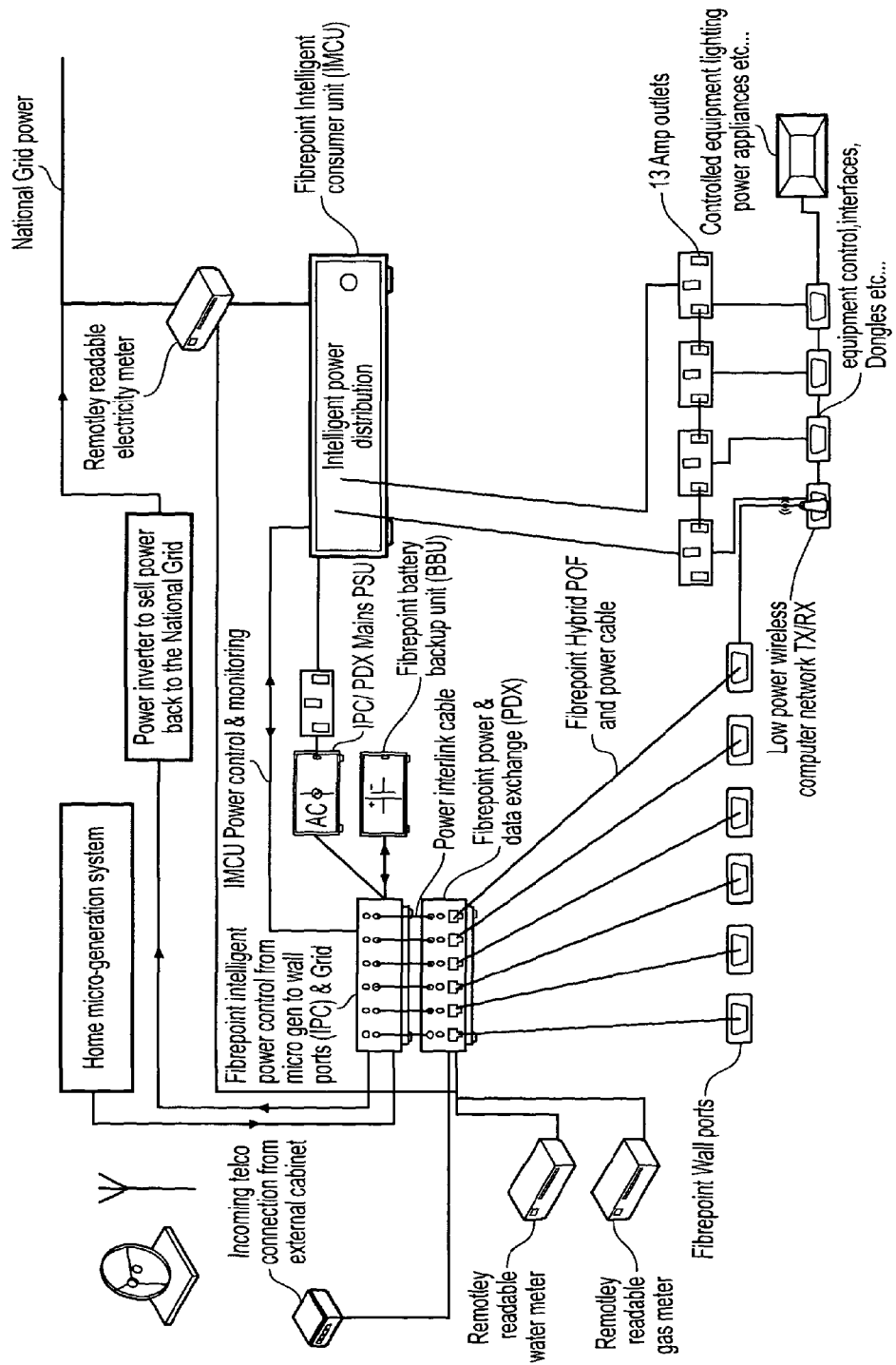
FIG. 17 is a diagrammatical view of an alternative embodiment of an integrated system, installed in a domestic environment fitted with an intelligent power management system.

FIG. 17 is a diagrammatical view of an alternative embodiment of an integrated system, installed in a domestic environment fitted with an intelligent power management system and shows a controller in the form of a data exchange which is connected to (and supervises) an intelligent power distribution.

FIGS. 18a-18d are diagrammatical views of an alternative embodiment of an integrated system. They show in greater detail the use of the composite cable and total system that permits data to be incorporated onto the 48 volt conductors. It is appreciated that an additional dedicated cable pair, for the use by this data may be included in the composite cable. It is also understood that intervening junctions or connections may be formed by piercing the electrical conductor, so as to 'daisy chain' power consuming devices, whilst leaving the optical data carrier intact. An advantage with this feature is that automatic re-routing of power and/or data around a network is achievable, for example in the event of a fault or severing of a cable.

The requirement for data communication to be supported in the event of a mains power failure to the property is achieved using this arrangement. This feature enables users to tap into an electrical pathway at any location and connect a 'limb' for providing a supply of electricity for example for powering a separate device. Wherever a cable is cut, there is therefore power, data, control, inputs and outputs, both two-way data flows and power flow is achievable without the need for 'patching'.

The system is designed to allow data under normal conditions to be converted by converters 117 and 118 to a modulation of the +48 volts that is distributed to all the selected nodes in an installation. This modulation is isolated from DC power loads by the use of a series inductor 114, 115.

In the event of failure of the +48 volt supply itself, autonomous equipment may be configured to connect from end to end of a hybrid cable in a manner similar to FIG. 11c.

The hybrid cable (FIG. 11c) with the capability of data transmission both in the fibre and on the 48 volt cable, allows for seamless integration of home automation or domotics. Domotics is the name given to the technology of home automation and systems integration.

The modular nature of the combined system with its both separate and combined aspects of flow of DC power in either direction. Data, from DC to several GHz, control functions and any combination of these as required, allows for a fully upgradeable system from two nodes and upwards. The basic framework of an individual cable going from say an 8-way switch to the wall plate, allows equipment using any format to be connected at either end of a supply.

There is a multiplicity of existing standards relating to transmission of control and data signals by modulating the voltage of power cables. The system as described herein allows for any of these to be adopted, as each cable leg is capable of being isolated from every other leg by the incorporation of inductors, or an equivalent device at each end of the cable leg. The system allows for different formats on every leg should this be required. The data and control information can be passed from one leg to another or to other equipment by the use of passive or active connection methods.

The choice of two different data transmission mechanisms and media, either optical or electrical conductor, for the transmission of the data requires that the differences are clearly understood.

The optical transmission of data is currently around 100 MHz and potentially at the GHz rate. It has high security from eavesdropping by cyber terrorists due to there being no electromagnetic radiation from optical cable. There is also high immunity to data corruption from induced noise due to radio frequency interference and cross coupling from proximity to other cables. Optical systems use a standard transmission protocol such as 100BASE-FX and the implication of this is that components required for this are relatively costly, even if only a low level of data transmission is required. There is also a significant continual power consumption required to keep the data communication pathway enabled and ready for data transmission.

The transmission of data via a modulation on 48 volt conductors is suited to a lower level of data rate than that achieved via the optical fibre. It has lower security due to the potential radio frequency transmission from the cable. It also has a low immunity from electromagnetic fields especially from adjacent cabling. The advantage is that any given leg of cable can accept any kind of data transmission protocol and also the components required for putting the modulation on and off the cable can be extremely low cost depending on the data rate, security and quality of service required.

The modulation technique can also be chosen for extremely low quiescent power consumption. The convenience of the electrical conductor pair, from the wall port in having both the power and data combined, is very beneficial for applications such as sensors and controls. The use of this kind of data transmission occurs in a very controlled environment and consequently the amplitude of the modulation can be relatively small, which is consistent with good data transmission properties.

One of the main objections of mains borne signalling and data, is that the signalling itself is a form of electromagnetic pollution as it is transmitted everywhere until it is eventually attenuated by the cable characteristics and the impedances of equipment connected across the mains cables. It is this unpredictable nature of transmission characteristics that means the modulation signal levels have to be high, in a mains borne signalling system, in order that the signals get from one point to another with a chance of being reconstituted into the original data format without too many errors.

Figure 18A:
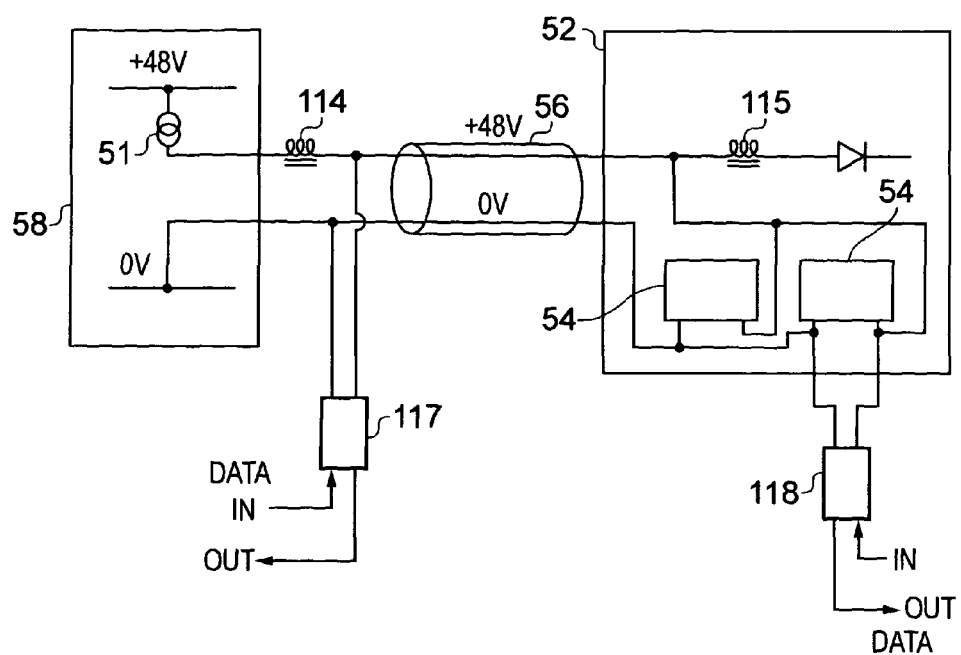
FIG. 18 is a diagrammatical view of how modulation on a 48 volt cable provides an additional pathway for data transmission.

FIG. 18a shows a single isolated control/data path using modulation of 48V DC conductor. It shows a single cable leg 56 with the modulation isolated from the DC power loads by the use of series inductors 114 and 115. This enables any data format to be utilised as there is no interaction with the rest of the system. The connectors 54 on the front of the plate 52 are directly connected by hybrid cable 56 to the DC distribution assembly 58. This has a current limited output 51 so as to tolerate inadvertent shorting with no ill effect. The system is designed to allow data under normal conditions to be converted by converters 117 and 118 to a modulation of the +48 volts that is distributed to the two nodes in an installation terminated by inductors 114 and 115. The example of FIG. 11 shows a telephone illustrating this.

FIG. 18a is a diagrammatical view of how modulation on a 48 volt cable provides an extra pathway for data transmission, in either direction, between the 8 way switch and the wall plate by using ballast inductors at each end to isolate the 48 volt power from the modulation.

Figure 18B:
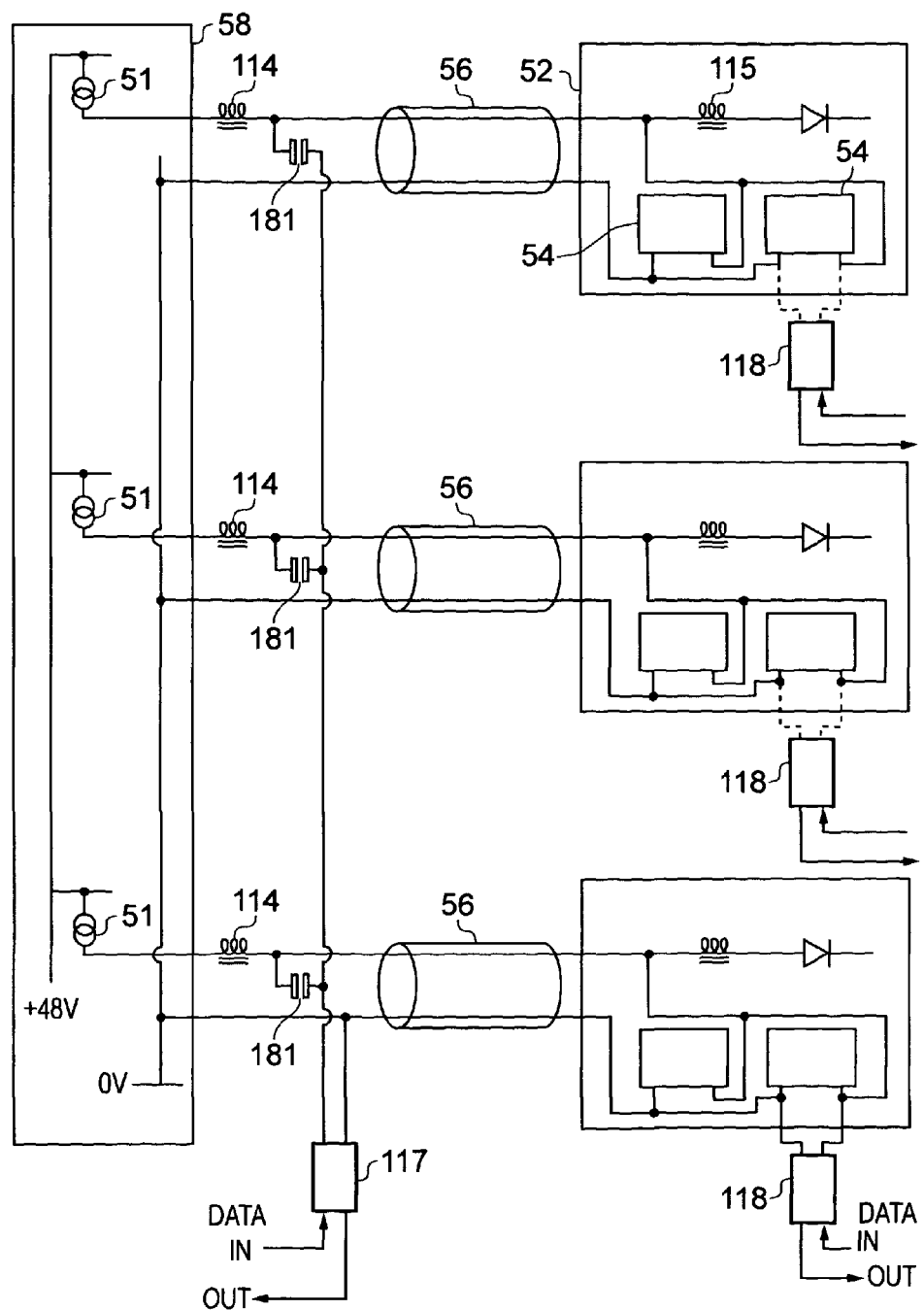

FIG. 18b shows a passive linked control/data path. FIG. 18b shows three connected cable legs by way of example. The three capacitors 181 connect the 3 legs together for data transfer purposes but enable DC isolation of each cable leg.

Figure 18C:
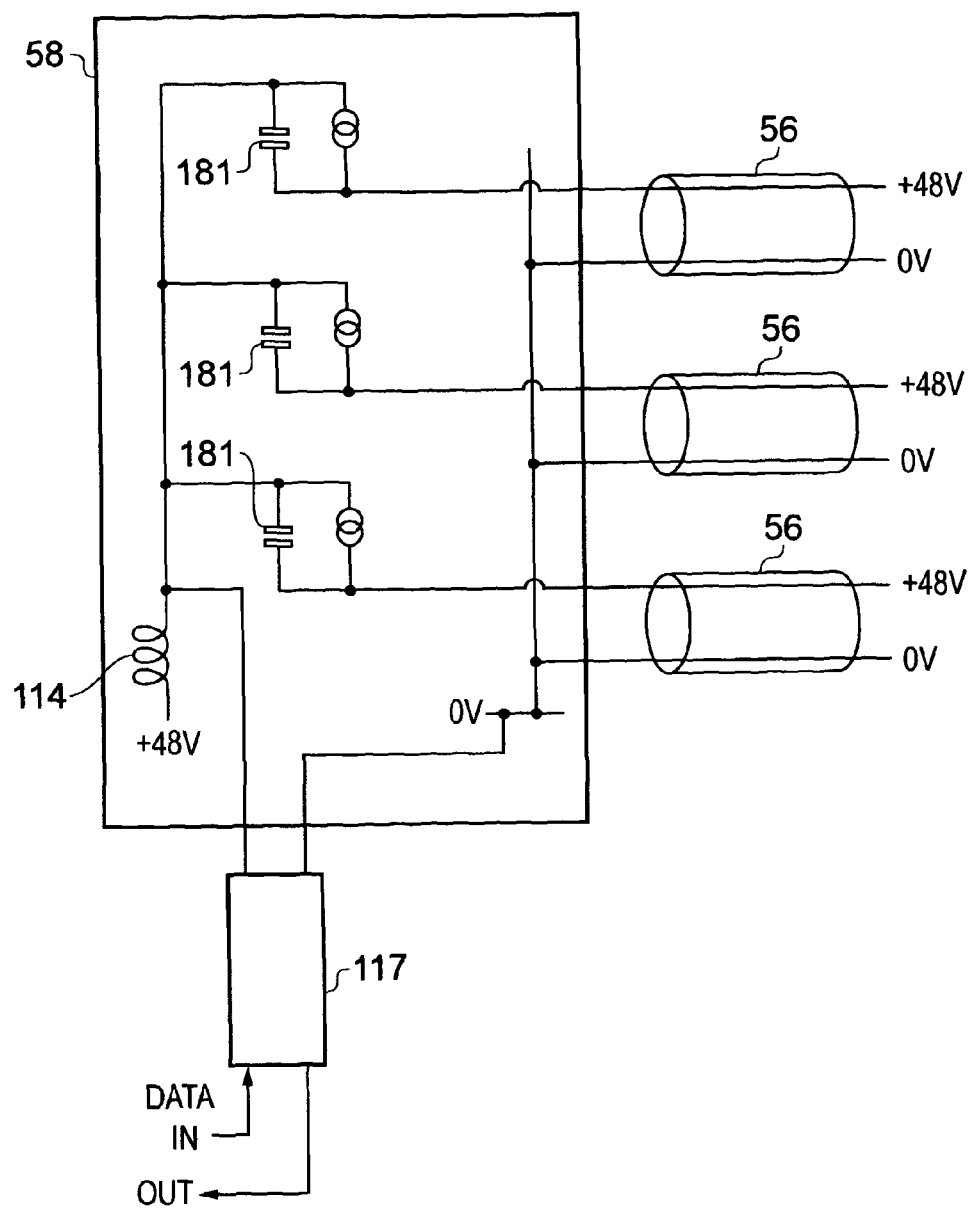

FIG. 18c shows an alternative passive linked control/data path. The alternative wiring of the three capacitors 181 allows for one inductor 114 to be used.

Figure 18D:
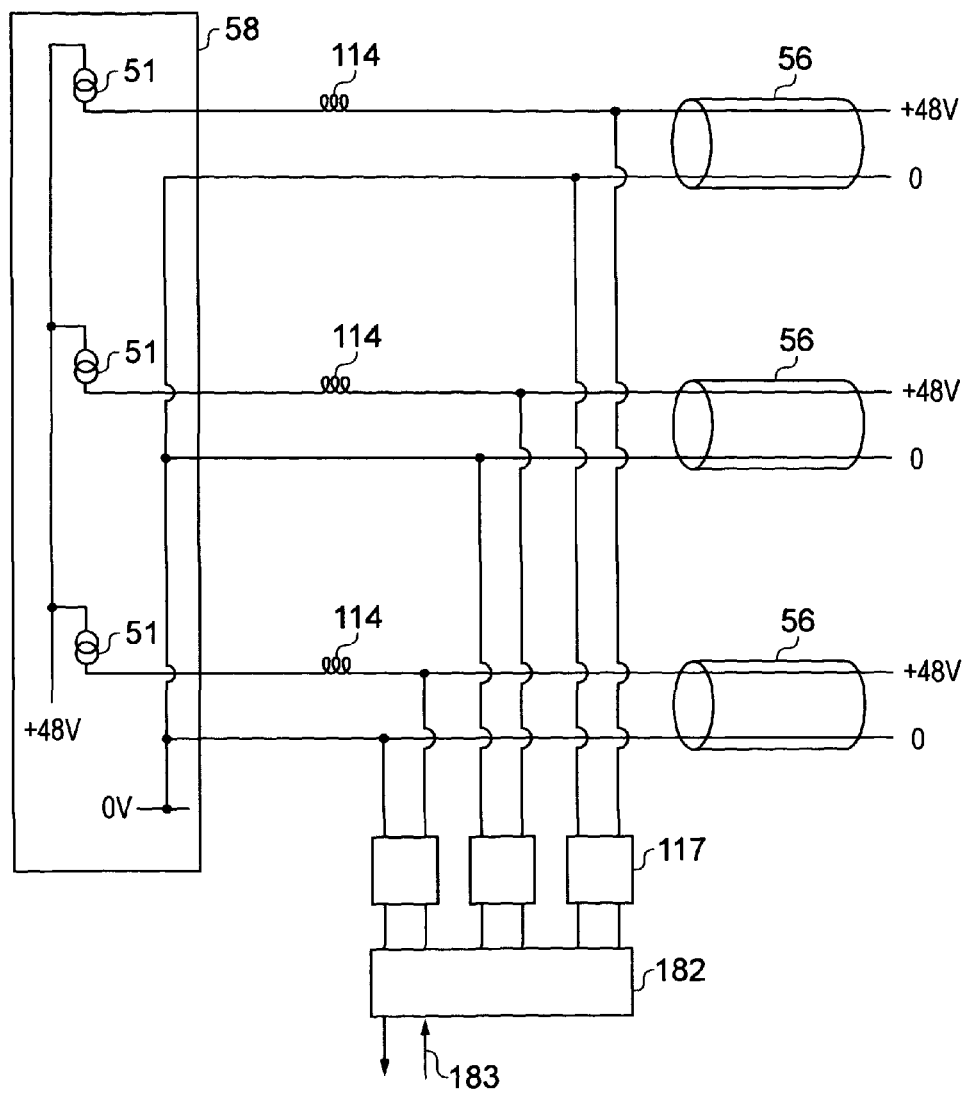

FIG. 18d shows an active linked control/data path. This has the result that the system is actively connected but each limb is isolated from the other. In this example the data to each cable leg is converted by a data converter for each leg. The data from each converter is connected to an active multiplexer.

The active multiplexer enables data to be collected and routed as desired to obtain a particular system function. The connections 183 may be for other data handling apparatus, for example a domestic security system.

FIG. 19 is a diagrammatical view of another embodiment of the invention and shows the relatively low voltage continual power bus typically carrying up to 100-200 Watts to each plate. This allows for direct connection of the majority of standard equipment that would usually be connected to the 230 volt AC power distribution system, to be plugged in to the wall plates instead of using an appropriate power voltage converter or direct connection using dual voltage standard equipment.

FIGS. 19a to 19e are diagrammatical views of alternative embodiments showing the relatively low voltage continual power bus typically carrying up to 100-200 Watts to each plate allowing for the direct connection of the majority of low powered standard equipment that would usually be connected to the 230 volt AC power distribution system to be plugged in to the wall plates instead using an appropriate power voltage converter or direct connection using dual voltage standard equipment.

So-called up converters, may be included in a front plate, or may be plugged into the front plate or powered via a spur accessible from the front plate. These up-converters can be arranged to convert 48 Volts to either 120 Volts or 230 Volts (DC or AC) and this can be used to operate other domestic equipment, provided there is sufficient current. Again these may be controllable if required by the plate/node.

Down converters may be used to convert 48 Volts to 12 Volts, 5 Volts, 3.3 Volts or indeed any other voltage. Down converters may be controllable if required by the plate.

Figure 19A:
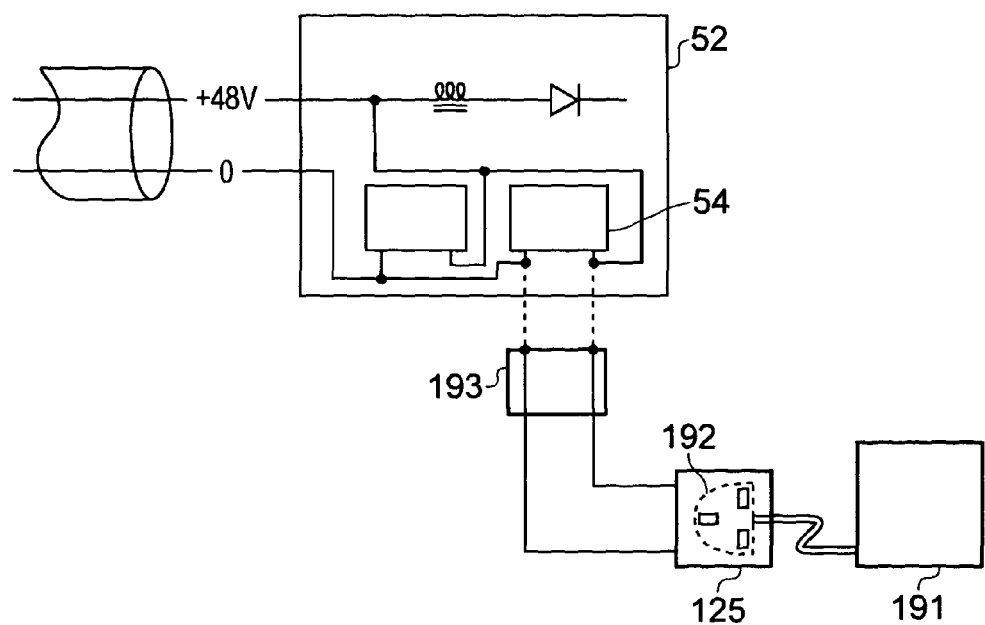
FIGS. 19a to 19e show diagrammatical views of a relatively low voltage continual power bus with a variety of different devices connected.

FIG. 19a shows an embodiment with a down-converter and a standard electrical appliance, such as a Hi-Fi system 191 with a conventional mains plug 192. This is plugged into the stand alone DC to AC inverter 125 which draws its 48 volt DC power from plug 193 which is connected to the socket 54 of wall plate 52. An alternative embodiment of this feature is converter 123 in FIG. 12.

Figure 19B:
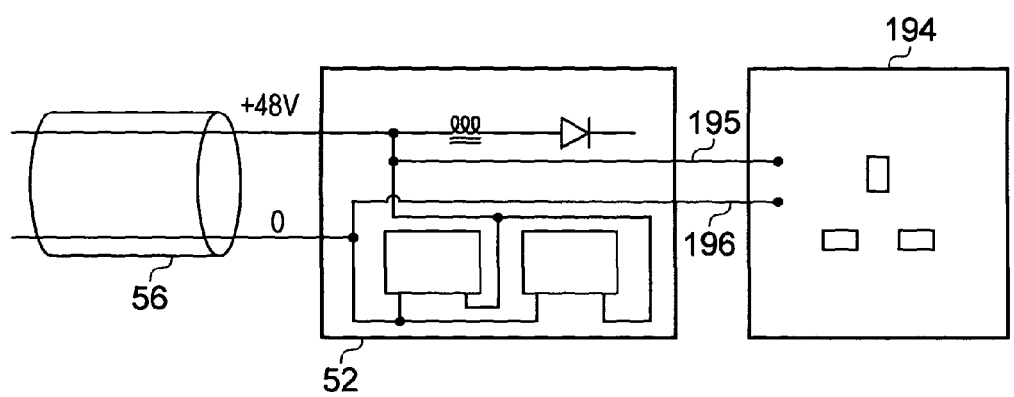

FIG. 19b shows an embodiment where the DC to AC inverter is fitted into the wall socket itself 194 and connected by wires 195 and 196 to the rear of wall plate 52 where the composite cable 56 is terminated.

Figure 19C:
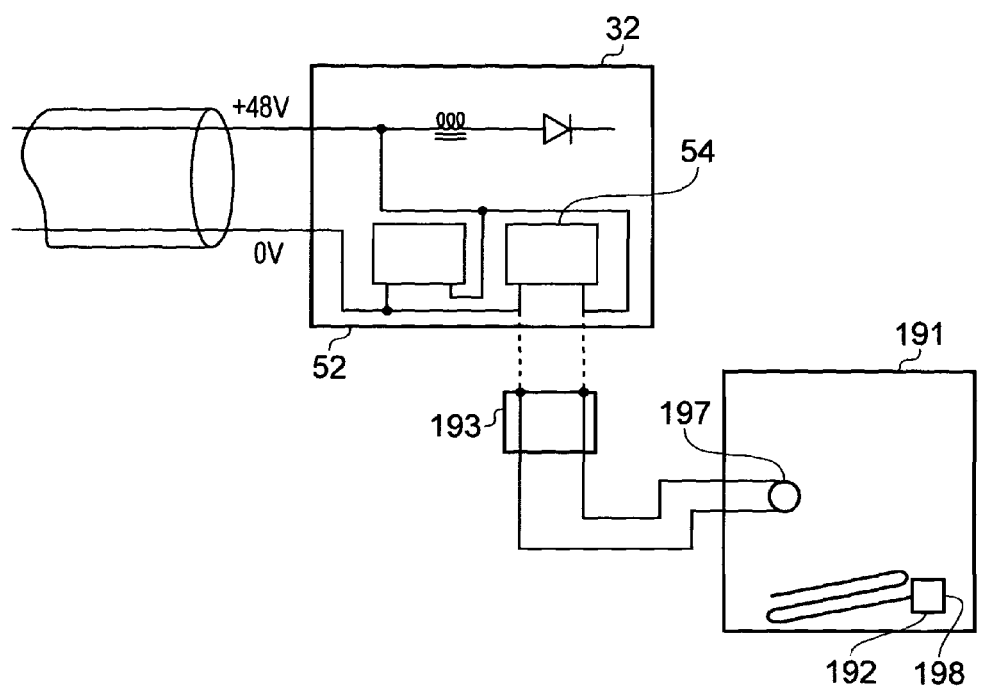

FIG. 19c shows an embodiment with a standard electrical appliance, for example a Hi-Fi system 191 that is a dual voltage design allowing for it to be either connected to the 230 volts AC mains or the 48 volts DC supply. In this case, mains plug 192 is secured away from view in a plug park 198. The 48 volts is supplied from wall plate 52 at socket 54 and is connected by plug 193 to the 48 volt input 197 to the equipment 191.

Figure 19D:
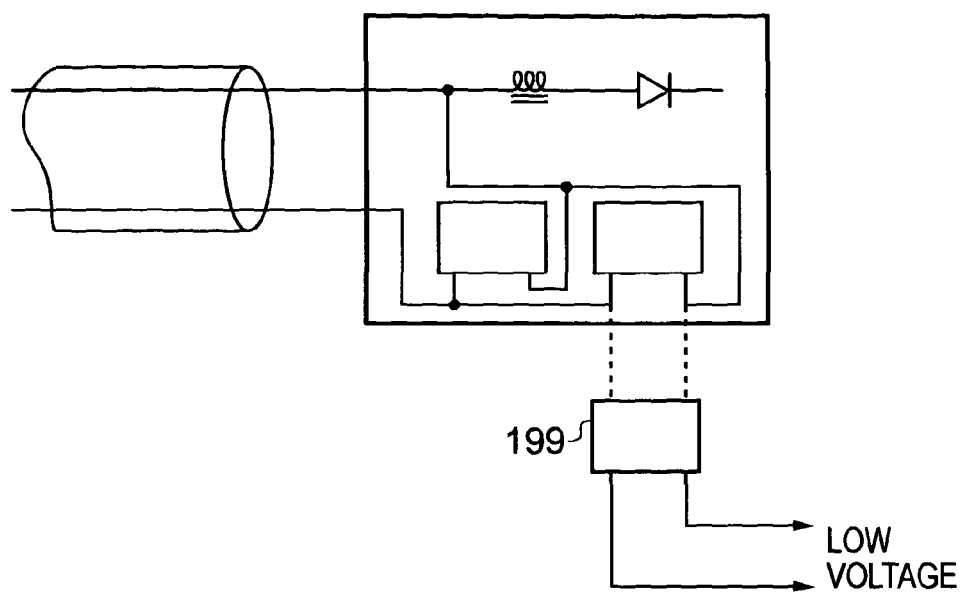

FIG. 19d shows an embodiment of the reduced low voltage output capability which uses a step down converter 199 to reduce the 48 volts DC to a lower voltage such as 9 volts to provide the power for a cordless phone master base.

Figure 19E:
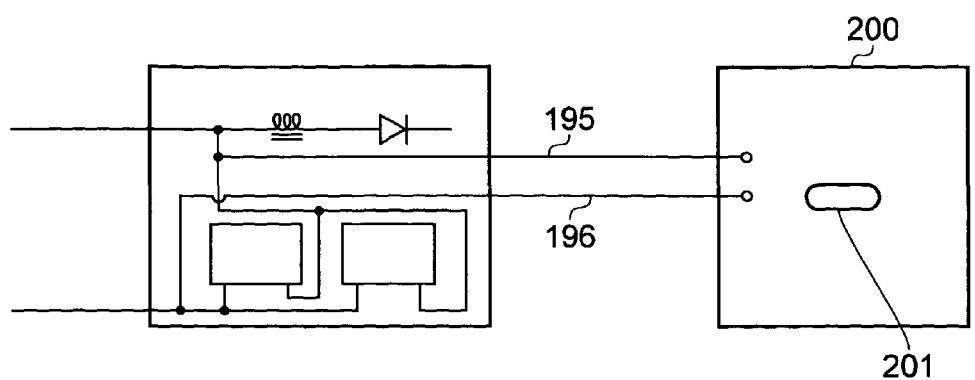

FIG. 19e shows an embodiment of the reduced low voltage output capability by using a step down converter integrated into a wall socket 200 with an external surface USB connector 201. The voltage step-down is from 48 volts to 5 volts suitable for USB connected equipment charging purposes.

The invention provides for redundancy so as to provide features that allow for automatic reconfiguration of pathways and networks, such as in a ring arrangement when a line or part of a network becomes damaged or impaired.

Another feature of the invention is that it finds application as part of new Building Environment Total System (BETS) applications, thereby facilitating smart management of resources and optimisation of power usage whilst also minimising power consumption.

For example power and fibre could be via separate cables or the fibre optic cable could be electrically conductive in order to transfer power.

The invention has been described by way of example only and variation may be made to then without departing from the scope of the invention. Likewise it is understood that several embodiments, with modifications and alternatives, have been described, but having read and understood this description further embodiments and modifications will be apparent to those skilled in the art.

All such embodiments and modifications are intended to fall within the scope of the present invention as defined in the accompanying claims.

The invention facilitates such integrated systems and intelligent building management as pooling of power sources, charged cells, generators, solar panels and photovoltaic devices to operate on a load sharing basis.

In addition the invention facilitates time shifting of power requirements by intelligent management, shifting and use of power sources such as capacitors, batteries, and off-peak supplies.

Furthermore the invention facilitates use of scavenging equipment such as heat pump and other low current devices arranged to divert stray power to charge reservoirs, batteries or capacitors, which may then be used to deliver power to operate appliances, peripherals and devices in short bursts.

It is understood that the system can be modified for use as a remote monitoring and health provision for example in care homes and sheltered accommodation. Increasingly, in many states, there is a move to provide care, monitoring and support to allow people to live as comfortably and independently as possible in their own homes. This is both perceived to be a cost effective solution to an aging population as well as a much more desirable option than hospitalising the elderly and infirm. To this end a system of remote monitoring, communication and control with the back up of DC power for reliability and safety is anticipated to be desirable.

It is likewise understood that a range of sizes of electrical conductor may be provided to suit power transmission requirements. Optionally voltage polarity may be used as a means of controlling or altering functionality of the system. For example at 48 volts to perform switching and provide emergency function by the use of diodes, may be provided to conduct +48 volts for normal operation and use −48 volts for emergency function.

Processing capabilities, for example may be provided by a micro processor, so as to monitor the data and/or power consumption/power rating of a device or appliance, so that in the event of demand placed by appliances exceeding maximum supply or capability, selective isolation of appliances can be performed automatically. Optionally appliance may be isolated in accordance with a hierarchical importance which is determined by a user.

The invention claimed is:

1. A system for power distribution and data communication comprising:
    a network having a data bus and an electrical conductor, the data bus and electrical conductor being encased within a sleeving, the data bus defining a path for data, and the conductor defining an electrical path for power, whereby in use appliances are connected to the network;
    wherein the sleeving is shaped and dimensioned to be capable of receiving junction connectors for providing simultaneous communication to the data bus and contact with the electrical path, and wherein a junction connector connects an appliance to the network and provides simultaneous communication to/from the data bus and electrical connector from/to the connected appliance;
    a processor adapted as a controller to monitor a supply of electrical energy to the appliance and relay data relating to a condition or state of the system via either the data bus or the electrical conductor to an appliance selected from a hierarchy of a plurality of appliances in accordance with at least one predetermined criterion including power consumption requirements of each of said plurality of appliances; and
    a switch to adjust a state or condition of the appliance by way of a means for isolating appliances which turns on or turns off the appliance upon receipt of a control signal from the controller in accordance with the at least one predetermined criterion including hierarchical significance.

2. A system according to claim 1 wherein the criteria are from the group comprising:
    current, maximum power rating;
    duration of operation;
    bandwidth requirements; and
    data usage.

3. A system according to claim 1, wherein:
    a filter, such as an inductor, is located at a terminal of the electrical path, so as to isolate any data on the electrical path from power on the electrical path.

4. A system according to claim 1, wherein:
    a data bus includes an independent power supply so as to enable the data bus to communicate with the network when power is not present on a mains supply line.

5. A system according to claim 1, further comprising:
    means for monitoring a current to an appliance, connected to the mains when power is not present on a mains supply line.

6. A system according to claim 1, further comprising:
    a current limiter to allocate electrical current to a plurality of appliances.

7. A system according to claim 1, further comprising:
    a filter to remove electrical noise.

8. A system according to claim 1, which includes a data communication system comprising:
    a multi-core cable;
    an optical fibre data cable within said multi-core cable;
    a power supply cable within said multi-core cable;
    an insulating sheath about said multi-core cable;
    a connector clamp with means to pierce through the insulating sheath to electrically connect to said multi-core cable; and
    a data distribution device to electrically connect to said connector clamp to facilitate data and/or power distribution.

9. A system according to claim 8, wherein the data bus comprises:
    an optical fibre.

10. A system according to claim 8, wherein:
    the optical fibre is formed from synthetic plastics material, such as a polymer.

11. A system according to claim 8 which is adapted to carry a voltage less than 240 Volts, ideally less than 60 Volts and preferably 48 Volts.

12. A system according to claim 8, further comprising:
    a connector clamp to incorporate means to connect electrically to said optical fibre data cable and/or said power supply cable upon clamping about the cable.

13. A system according to claim 8, further comprising:
    a terminal connector which is adapted to connect to a peripheral device, from the group of devices comprising:
    a wireless data transmitter/receiver device,
    an encoder suitable for converting one signal into another,
    an amplifier,
    a filter,
    a switch,
    a timer,
    a personal computer,
    a laptop, a display,
a printer,
a scanner, and
a telephone.

14. A system according to claim 1, further comprising devices from the group comprising:
clamps,
junction boxes,
amplifiers,
multiplexers,
attenuators,
adaptors, and
splitters.

15. A system according to claim 1, further comprising:
lamps,
chargers,
fans,
displays,
printers and
scanners.

16. A network according to claim 1, further comprising sources of electrical energy including:
solar panels,
wind generators,
batteries,
dynamos,
fuel cells and
Stirling engines.

17. A system according to claim 1, further comprising:
a data communication system wherein a programmable device is adapted to multiplex a signal from a plurality of signals.

18. A system according to claim 1, further comprising:
a connector profiled to match the profile of the cabling and arranged to cooperate therewith so as to form simultaneously electrical and optical components.

19. A system according to claim 1 wherein at least two channels are provided:
a first channel for a first service provider, and
a second channel for a second service provider.

20. A system according to claim 1, wherein the means to pierce comprises:
a plurality of metal projections for forming an electrical connection and at least one optical connection.

21. A building, office or dwelling, includes a system according to claim 1 so that a low voltage network provides a power supply.

22. A method of communicating using the system of claim 1, comprising the steps of providing:
a data bus and an electrical conductor encased within a sleeving, the data bus defining a path for data and the conductor defining an electrical path;
the sleeving being shaped and dimensioned so as to be capable of receiving junction connectors, piercing the sleeving, so as to provide simultaneous connection to the data bus and electrical path and extraction of current and/or data.

\* \* \* \* \*